(12) United States Patent
Sollie et al.

(10) Patent No.: US 12,466,154 B2
(45) Date of Patent: *Nov. 11, 2025

(54) CUSHIONING SHEET

(71) Applicant: Pratt Corrugated Holdings, Inc., Brookhaven, GA (US)

(72) Inventors: Greg Sollie, Sharpsburg, GA (US); Christopher M. Stanton, Peachtree City, GA (US)

(73) Assignee: Pratt Corrugated Holdings, Inc., Brookhaven, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/043,816

(22) Filed: Feb. 3, 2025

(65) Prior Publication Data

US 2025/0178305 A1 Jun. 5, 2025

Related U.S. Application Data

(60) Continuation of application No. 18/655,030, filed on May 3, 2024, now Pat. No. 12,214,576, which is a
(Continued)

(51) Int. Cl.
*B32B 3/08* (2006.01)
*B32B 3/30* (2006.01)
(Continued)

(52) U.S. Cl.
CPC ............ *B32B 3/08* (2013.01); *B32B 3/30* (2013.01); *B32B 7/12* (2013.01); *B32B 29/005* (2013.01);
(Continued)

(58) Field of Classification Search
None
See application file for complete search history.

(56) References Cited

U.S. PATENT DOCUMENTS 4,861,170 A 8/1989 Patriksson
12,214,576 B2 * 2/2025 Sollie .................. B32B 37/0053
(Continued)

FOREIGN PATENT DOCUMENTS

EP 2463088 A2 * 6/2012 ............. B31D 5/006
WO 2021155145 8/2021

OTHER PUBLICATIONS

Moore, Benjamin Edward Lee; Non-Final Office Action for U.S. Appl. No. 18/636,656, filed Apr. 16, 2024, mailed Dec. 13, 2024, 14 pgs.
(Continued)

*Primary Examiner* — Mohammad M Ameen
(74) *Attorney, Agent, or Firm* — Taylor Duma LLP

(57) ABSTRACT

A cushioning sheet includes a first layer defining a first inner surface; a second layer coupled to the first layer, the second layer defining a second inner surface facing the first inner surface so that the first inner surface and the second inner surface define a plurality of voids therebetween; and a plurality of cushioning inserts disposed between the first layer and the second layer, wherein each of the plurality of cushioning inserts is received in a corresponding one of the voids, and each void has a diameter that is larger than a diameter of the cushioning insert disposed therein so that each void is configured to loosely receive the cushioning insert disposed therein.

20 Claims, 12 Drawing Sheets

Related U.S. Application Data division of application No. 18/146,244, filed on Dec. 23, 2022, now Pat. No. 12,043,015, which is a division of application No. 17/177,908, filed on Feb. 17, 2021.

(60) Provisional application No. 63/059,001, filed on Jul. 30, 2020.

(51) Int. Cl.
*B32B 7/12* (2006.01)
*B32B 29/00* (2006.01)
*B32B 37/00* (2006.01)
*B32B 37/10* (2006.01)
*B65D 27/14* (2006.01)
*B65D 81/02* (2006.01)
*B65D 81/03* (2006.01)

(52) U.S. Cl.
CPC .......... *B32B 37/0053* (2013.01); *B32B 37/10* (2013.01); *B65D 27/14* (2013.01); *B65D 81/02* (2013.01); *B65D 81/03* (2013.01); *B32B 2307/558* (2013.01); *B32B 2439/40* (2013.01)

(56) References Cited

U.S. PATENT DOCUMENTS

| | | |
|---|---|---|
| 12,415,331 B2 | 9/2025 | Sollie et al. |
| 2007/0082181 A1* | 4/2007 | Jung ............. B32B 3/085 428/182 |
| 2024/0286375 A1 | 8/2024 | Sollie et al. |

OTHER PUBLICATIONS

Sollie, Greg; Notice of Allowance for U.S. Appl. No. 18/655,030, filed May 3, 2024, mailed Nov. 19, 2024, 12 pgs.
Sollie, Greg; Non-Final Office Action for U.S. Appl. No. 18/655,030, filed May 3, 2024, mailed Aug. 22, 2024, 28 pgs.
Moore, Benjamin Edward Lee; Final Office Action for U.S. Appl. No. 18/636,656, filed Apr. 16, 2024, mailed Jun. 12, 2025, 5 pgs.
Sollie, Greg; Notice of Allowance for U.S. Appl. No. 17/177,908, filed Feb. 17, 2021, mailed May 19, 2025, 12 pgs.
Sollie, Greg; Non-Final Office Action for U.S. Appl. No. 18/099,502, filed Jan. 20, 2023, mailed Jun. 4, 2025, 29 pgs.
Sollie, Greg; Notice of Allowance for U.S. Appl. No. 18/099,502, filed Jan. 20, 2023, mailed Jul. 17, 2025, 8 pgs.
Moore, Benjamin Edward Lee; Notice of Allowance for U.S. Appl. No. 18/636,656, filed Apr. 16, 2024, mailed Sep. 10, 2025, 9 pgs.
Sollie, Greg; Non-Final Office Action for U.S. Appl. No. 18/151,220, filed Jan. 6, 2023, mailed Aug. 28, 2025, 16 pgs.

* cited by examiner

CUSHIONING SHEET

CROSS-REFERENCE TO RELATED APPLICATIONS

The present application is a continuation of U.S. application Ser. No. 18/655,030, filed May 3, 2024, which is a divisional of U.S. application Ser. No. 18/146,244, filed Dec. 23, 2022, which issued as U.S. Pat. No. 12,043,015 on Jul. 23, 2024, which is a divisional of U.S. application Ser. No. 17/177,908, filed Feb. 17, 2021, which claims the benefit of U.S. Provisional Application No. 63/059,001, filed Jul. 30, 2020, each of which is hereby specifically incorporated by reference herein in its entirety.

TECHNICAL FIELD

This disclosure relates to cushioning materials. More specifically, this disclosure relates to a sheet with cushioning inserts.

BACKGROUND

Cushioning sheets, such as wrapping paper and bubble wrap, are often used as cushioning for fragile objects during shipping. Wrapping paper typically comprises a single, thin sheet of paper that can be bunched up and packed around the object to limit movement of the object within a package and to provide cushioning from heavy impacts. However, wrapping paper easily crumples under force, and, once crumpled, can lose its volume and effectiveness. Bubble wrap typically comprises a plastic sheet defining air fill pockets. However, typical plastic bubble wrap is not recyclable.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a cushioning sheet including a first layer defining a first inner surface; a second layer coupled to the first layer, the second layer defining a second inner surface facing the first inner surface so that the first inner surface and the second inner surface define a plurality of voids therebetween; and a plurality of cushioning inserts disposed between the first layer and the second layer, wherein each of the plurality of cushioning inserts is received in a corresponding one of the voids, and each void has a diameter that is larger than a diameter of the cushioning insert disposed therein so that each void is configured to loosely receive the cushioning insert disposed therein.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
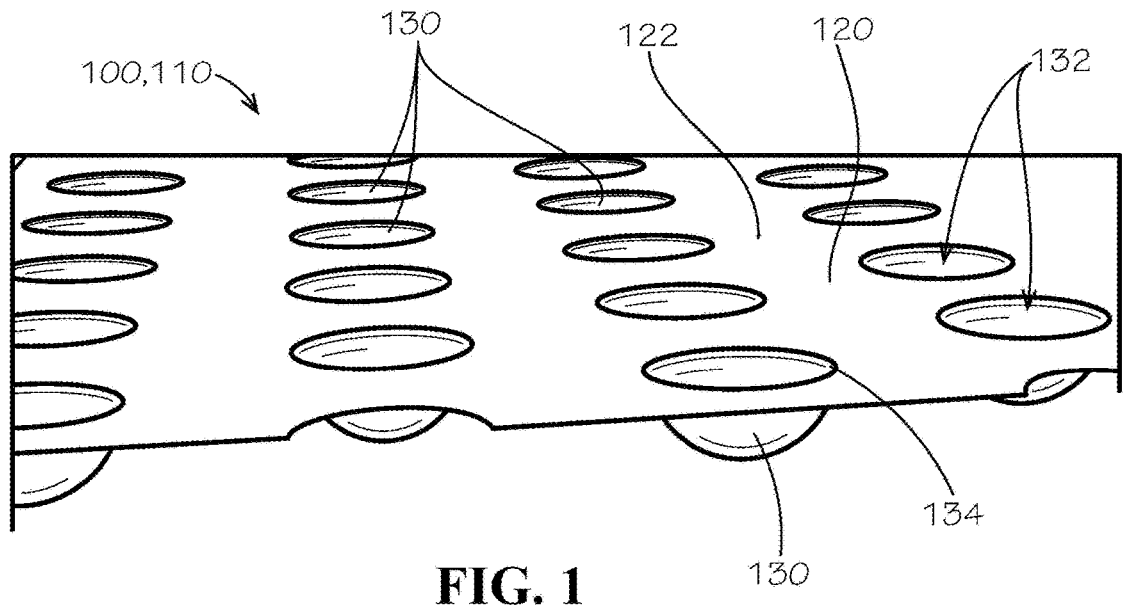
FIG. 1 is a top perspective view of a first paper layer, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a cushioning sheet and associated methods, systems, devices, and various apparatus. Example aspects of the cushioning sheet can comprise a first layer, a second layer, and a plurality of cushioning inserts received between the first layer and the second layer. In some aspects, the cushioning inserts can be substantially spherical in shape and can comprise a starch material. It would be understood by one of skill in the art that the cushioning sheet is described in but a few exemplary embodiments among many. No particular terminology or description should be considered limiting on the disclosure or the scope of any claims issuing therefrom.

FIG. 1 is a top perspective view of a first layer 100 of a cushioning sheet 700 (shown in FIG. 7), in accordance with one aspect of the present disclosure. According to example aspects, the cushioning sheet 700 can be formed by a rolling machine 1400 (shown in FIG. 14). In the present aspect, the first layer 100 can comprise a paper material and can therefore be a first paper layer 110. In some aspects, the paper material can be a tissue-grade paper material, which may be covered with a coating to increase strength while maintaining flexibility. In other aspects, the first layer 100 can comprise any other suitable material known in the art. As shown, according to example aspects, the first paper layer 110 can comprise a substantially planar first base 120 defining a first upper surface 122 and a first lower surface 824 (shown in FIG. 8). The first paper layer 110 can further define a plurality of first sockets 130 extending substantially downward from the first lower surface 824 of the planar first base 120, relative to the orientation shown. In the present aspect, each of the first sockets 130 can be formed as a substantially semi-spherical dome and can define a substantially semi-spherical first recess 132. As shown, each of the first sockets 130 are substantially uniform in size and shape, and each of the first recesses 132 are substantially uniform in size and shape. Each of the first sockets 130 can further define a substantially circular first opening 134 formed at the planar first base 120 that can allow access to the corresponding semi-spherical first recess 132. In the present aspect, each of the first sockets 130 can be spaced apart from adjacent first sockets 130, and the first sockets 130 can be oriented in a plurality of linear rows and columns; however, in other aspects, the first sockets 130 can be oriented in any other suitable arrangement or pattern.

Figure 2:
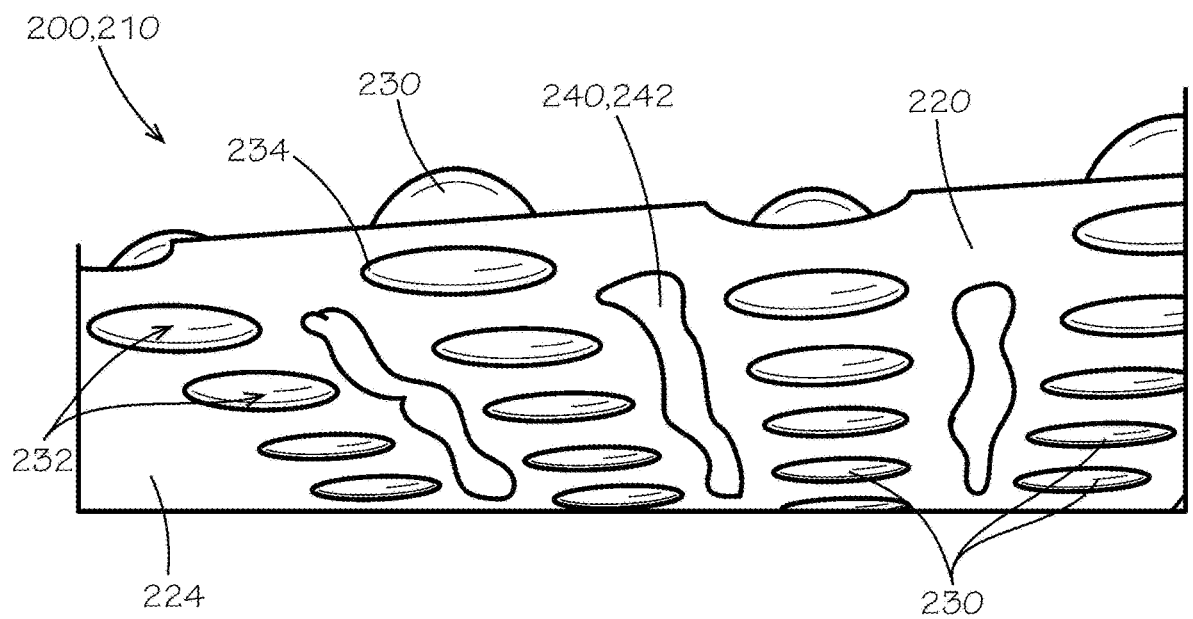
FIG. 2 is a bottom perspective view of a second paper layer, in accordance with another aspect of the present disclosure.

FIG. 2 illustrates a second layer 200 of the cushioning sheet 700 (shown in FIG. 7), in accordance with an aspect of the present disclosure. Like the first layer 100 (shown in FIG. 1), the second layer 200 can comprise a paper material and can therefore be a second paper layer 210. However, in other aspects, the second layer 200 can comprise any other suitable material known in the art, and may or may not comprise the same material as the first layer 100. Example aspects of the second paper layer 210 can be substantially similar as the first paper layer 110 (shown in FIG. 1), as described above. For example, the second paper layer 210 can comprise a substantially planar second base 220 defining a second upper surface 722 (shown in FIG. 7) and a second lower surface 224. The second paper layer 210 can further comprise a plurality of second sockets 230 extending from the planar second base 220. However, unlike the first paper layer 110, wherein the first sockets 130 (shown in FIG. 1) can extend substantially downward from the first lower surface 824 (shown in FIG. 1), the second sockets 230 can extend substantially upward from the second upper surface 722 of the second base 220, relative to the orientation shown. In the present aspect, each of the second sockets 230 can be formed as a substantially semi-spherical dome and can define a substantially semi-spherical second recess 232. As shown, each of the second sockets 230 are substantially uniform in size and shape, and each of the second recesses 232 are substantially uniform in size and shape. Each of the second sockets 230 can further define a substantially circular second opening 234 formed at the planar second base 220 that can allow access to the corresponding semi-spherical second recess 232. In the present aspect, each of the second sockets 230 can be spaced apart from adjacent second sockets 230, and the second sockets 230 can be oriented in a plurality of linear rows and columns; however, in other aspects, the second sockets 230 can be oriented in any other suitable arrangement or pattern. According to example aspects, the second sockets 230 and second recesses 232 of the second paper layer 210 can be substantially similar in size, shape, and arrangement to the first sockets 130 and first recesses 132 (shown in FIG. 1) of the first paper layer 110.

In some example aspects, as shown, an adhesive 240 may be applied to the second lower surface 224 of the planar second base 220. The adhesive 240 can be configured to secure the second layer 200 to the first layer 100, as described in further detail below. In other aspects, the adhesive 240 may instead be applied to the first upper surface 122 (shown in FIG. 1) of the planar first base 120 (shown in FIG. 1). In the present aspect, a thin film or layer of the adhesive 240 can be applied to the second lower surface 224; in other aspects, however, a substantially thick film or layer of the adhesive 240 may be applied. According to example aspects, the adhesive 240 can comprise a starch material, which can be repulpable in some aspects. For example, the adhesive 240 can be a thin film of a starch paste 242. In other aspects, the adhesive 240 can be any other suitable adhesive, including but not limited to, plastic adhesives, tape, and the like. As shown, in the present aspect, the adhesive 240 is applied to the second lower surface 224 only though in other aspects, the adhesive 240 may also be applied within the second sockets 230. Furthermore, while the adhesive 240 is depicted herein as covering only select portions of the second lower surface 224 of the planar second base 220, in other aspects, the adhesive 240 may substantially or entirely cover the second lower surface 224.

Figure 3:
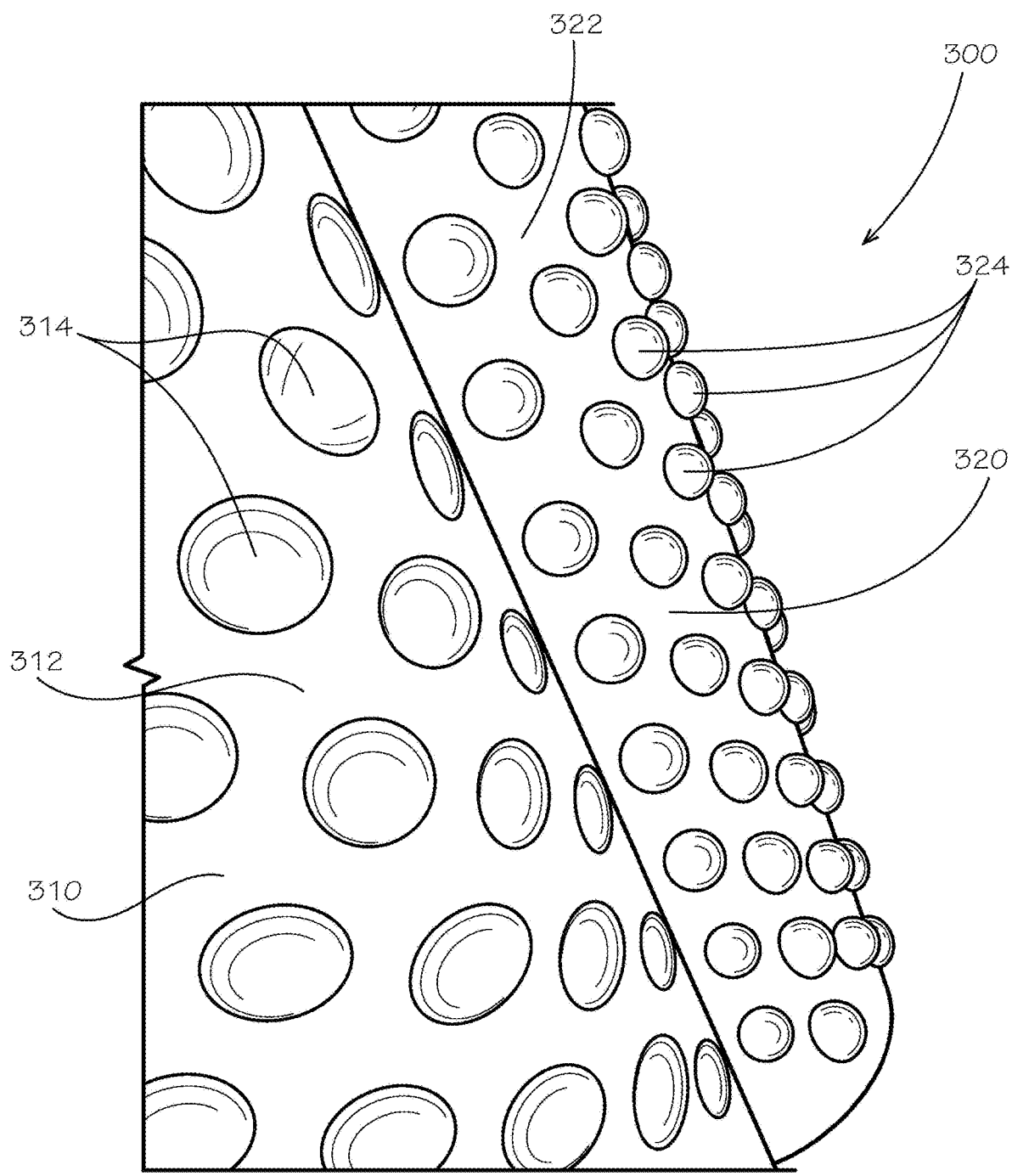
FIG. 3 is a top perspective view of a layer rolling device or forming the first paper layer of FIG. 1 and the second paper layer of FIG. 2.

FIG. 3 illustrates a layer rolling device 300 for forming the first and second sockets 130,230 of the first and second layers 100,200 (shown in FIGS. 1 and 2, respectively). As shown, the layer rolling device 300 can comprise a first layer roller 310 and a second layer roller 320. Each of the first and second layer rollers 310,320 can be substantially cylindrical in shape and can define a cylindrical outer surface 312,322, respectively. The first layer roller 310 can define a plurality of semi-spherical socket indentations 314 formed in the corresponding cylindrical outer surface 312, each of which can be substantially uniform in size and shape. The second layer roller 320 can define a plurality of semi-spherical socket projections 324 extending from the corresponding cylindrical outer surface 322, each of which can be substantially uniform in size and shape, and which can be configured to fit within a corresponding one of the socket indentations 314. According to example aspects, the first layer roller 310 and second layer roller 320 can be configured to rotate in unison, as each of the first layer 100 and second layer 200 are fed through the layer rolling device 300 between the first and second layer rollers 310,320. Prior to passing through the layer rolling device 300, each of the first and second layers 100,200 can be substantially planar. In some aspects, the first and second sockets 130,230 of the first and second layers 100,200 can be formed simultaneously by feeding the first and second layers 100,200 through the layer rolling device 300 at the same time, one on top of the other. However, in other aspects, such as the present aspect, the first layer 100 can be formed first, followed by the second layer 200, or vice versa.

In example aspects, each of the socket indentations 314 of the first layer roller 310 can be configured to align with a corresponding one of the socket projections 324 of the second layer roller 320 as the first and second layer rollers 310,320 confront one another during rolling. Each of the socket projections 324 can be configured to push a corresponding portion of the first layer 100 and second layer 200 into the corresponding one of the socket indentations 314 to form the first sockets 130 and second sockets 230, respectively. As such, each of the socket indentations 314 can be sized and shaped about equal to the first and second sockets 130,230, and each of the socket projections 324 can be sized and shaped about equal to the first and second recesses 132,232 (shown in FIGS. 1 and 2, respectively). Furthermore, as the first and second layers 100,200 are fed through the layer rolling device 300, the portions of the cylindrical outer surfaces 312,322 of the first and second layer rollers 310,320 extending between the socket indentations 314 can press the planar first base 120 and planar second base 220 (shown in FIGS. 1 and 2, respectively) therebetween to maintain the flat, planar shape thereof.

Figure 4:
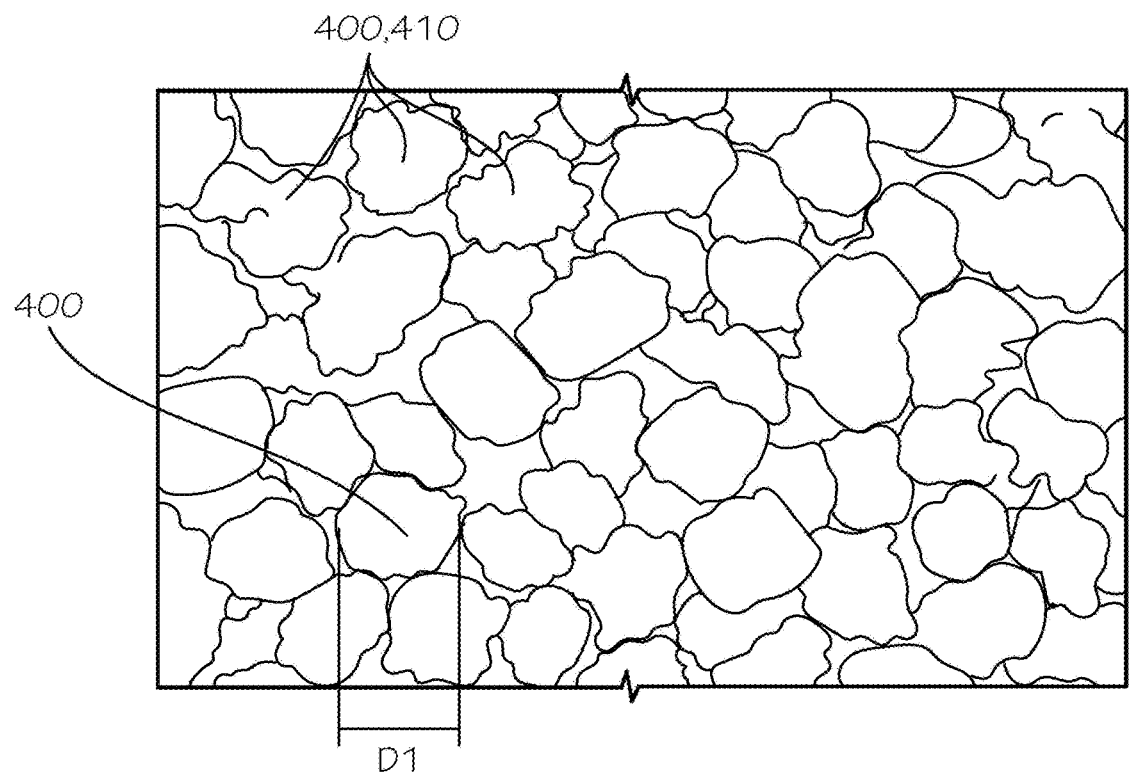
FIG. 4 is a top view of a plurality of spherical cushioning inserts, in accordance with another example aspect of the present disclosure.

FIG. 4 illustrates a plurality of cushioning inserts 400 configured to be received between the first and second layers 100,200 (shown in FIGS. 1 and 2, respectively), as described in further detail below. In the present aspect, each of the cushioning inserts 400 can define a substantially spherical shape, as shown. Moreover, in the present aspect, each of the cushioning inserts 400 can comprise a starch material, such that the cushioning inserts 400 can be starch cushioning inserts 410. For example, the starch material can comprise corn starch in some aspects. In other aspects, the cushioning inserts 400 may define any other suitable shape and/or may comprise any other suitable starch material or other material known in the art. The cushioning inserts 410 can further be repulpable in some aspects. According to example aspects, the cushioning inserts 400 can be formed by an extrusion process, followed by a chopping process. In some example aspects, in the extrusion process, the corn starch material can be extruded through a chamber with a small amount of moisture. The moisture can vaporize under heat during the extrusion, and an elongated, continuous tube of corn starch material can be formed. In the chopping process, a cutter can cut the tube of corn starch material into short segments, each of which can puff up and harden and cool into a substantially spherical shape. In the present aspect, each of the spherical cushioning inserts 400 can define a diameter $D_1$ of about. 0.375 inches. However, in other aspects, the cushioning inserts 400 can define any other suitable size and shape and/or can be formed by any other suitable processes known in the art.

Figure 5:
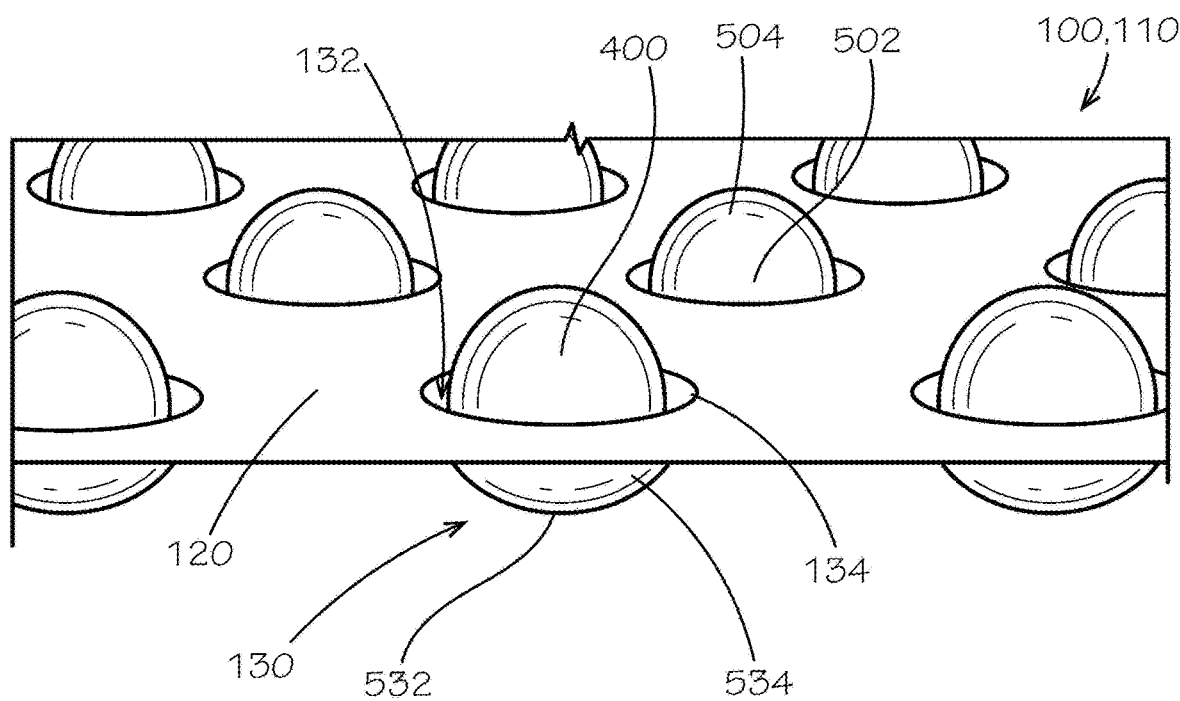
FIG. 5 is a top perspective view of the spherical cushioning inserts of FIG. 4 applied to the first paper layer of FIG. 1.
Figure 7:
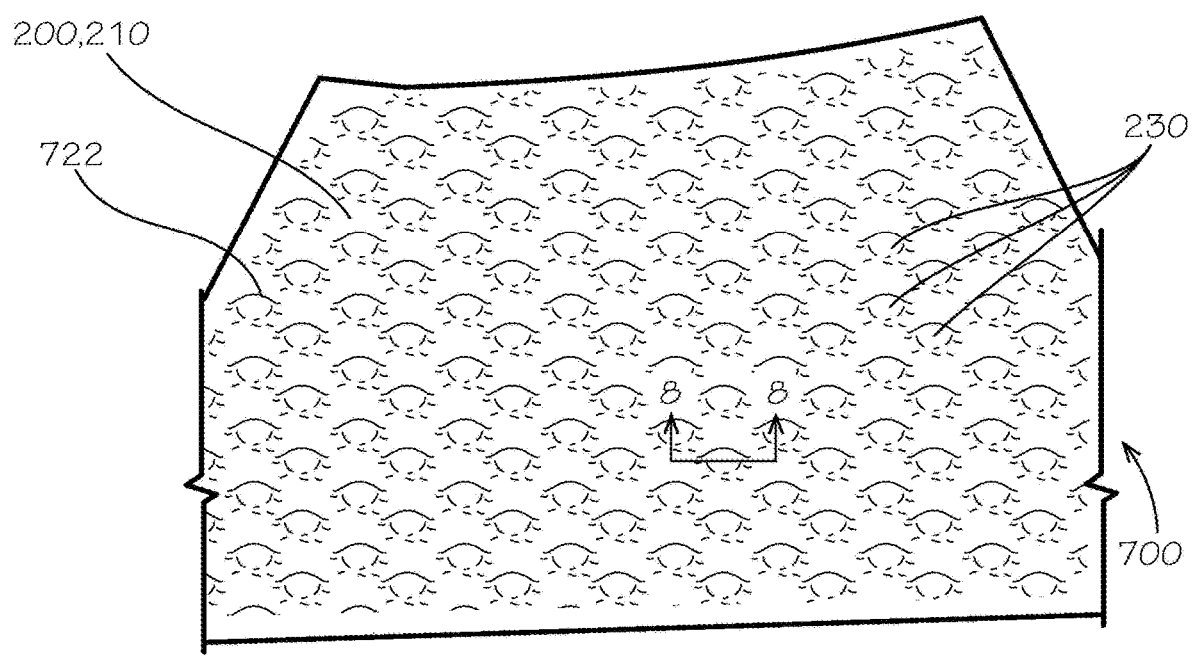
FIG. 7 is a top perspective view of the second paper layer of FIG. 2 laid over the first paper layer 1 of FIG. 1, such that the spherical cushioning inserts of FIG. 4 are received between the first and second paper layers. The first paper layer, second paper layer, and spherical cushioning inserts can together define a cushioning sheet, in accordance with another aspect of the present disclosure.

FIG. 5 illustrates a first step in assembling the cushioning sheet 700 of FIG. 7. As shown, each of the spherical cushioning inserts 400 can be placed into a corresponding one of the semi-spherical first sockets 130 of the first paper layer 110, such that each of the spherical cushioning inserts 400 is partially received within a corresponding one of the semi-spherical first recesses 132 and can rest on a bottom 532 of the first socket 130. For example, a lower portion 502 of each spherical cushioning insert 400 can be received within the corresponding first recess 132, while an upper portion 504 of the spherical cushioning insert 400 can extend past the corresponding first opening 134 to be oriented outside of the first recess 132. In the present aspect, the spherical cushioning inserts 400 can be sized such that a clearance is provided between the each of the spherical cushioning inserts 400 and corresponding sides 534 of the semi-spherical first socket 130, as shown. As such, each of the spherical cushioning inserts 400 can be free to roll around within the corresponding semi-spherical first recess 132. In some aspects, however, the clearance defined between the spherical cushioning inserts 400 and the sides 534 of the corresponding semi-spherical first sockets 130 may be reduced such that movement of the cushioning inserts 400 within the corresponding semi-spherical first recesses 132 may be limited or prohibited. Furthermore, in some aspects, the spherical cushioning inserts 400 may be secured to the first paper layer 110 within the corresponding first recesses 132 to limit or prohibit movement therein by a fastener, such as, for example, an adhesive, such as glue. For example, the glue can be PVA (polyvinyl acetate) glue in some aspects.

Figure 6:
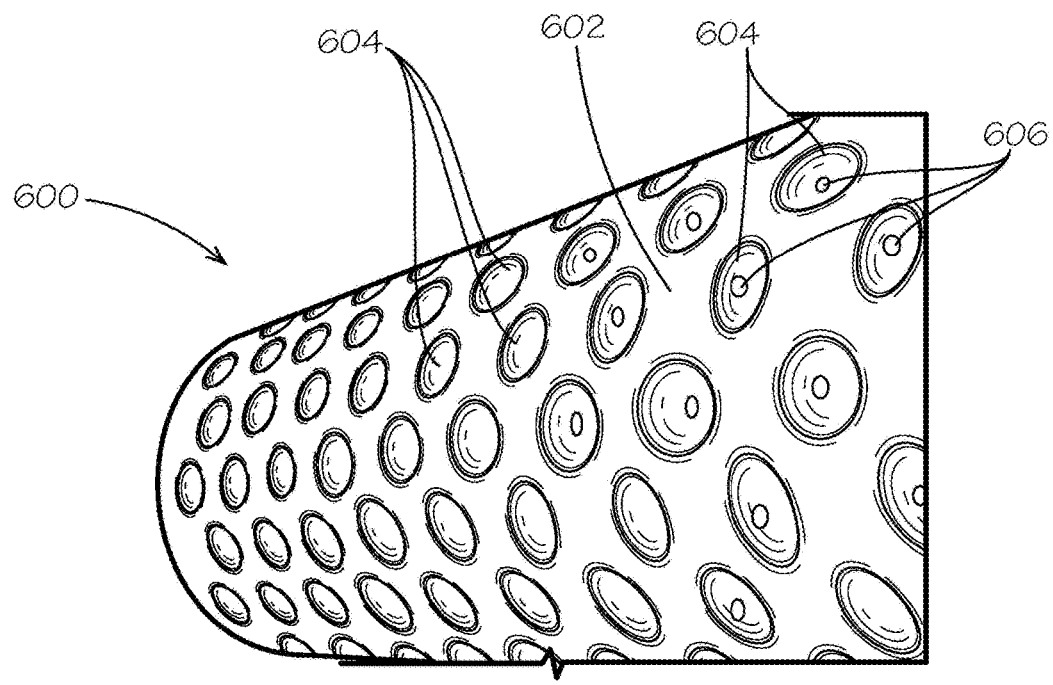
FIG. 6 is a perspective view of a vacuum roller configured to deposit the spherical cushioning inserts of FIG. 4 onto the first paper layer of FIG. 1.

According to example aspects, as shown in FIG. 6, a vacuum roller 600 may be provided for picking up the spherical cushioning inserts 400 (shown in FIG. 4) and depositing them onto the first paper layer 110 (shown in FIG. 1). As shown, in the present aspect, the vacuum roller 600 can define a substantially cylindrical outer surface 602 and a plurality of insert indentations 604 formed therein, each of which can be configured to pick up and retain one of the spherical cushioning inserts 400 therein. For example, each of the insert indentations 604 may comprise a vacuum port 606 configured to draw a corresponding one of the cushioning inserts 400 into the insert indentation 604. Each spherical cushioning insert 400 can then be released from the corresponding insert indention into a corresponding one of the first recesses 132 (shown in FIG. 1) of the first paper layer 110. In other aspects, the spherical cushioning inserts 400 can be deposited into the corresponding first recesses 132 by any other suitable method known in the art. In other aspects, the cushioning inserts 400 can be deposited by the vacuum roller 600 or any other suitable method into the second recesses 232 (shown in FIG. 2) of the second paper layer 210 (shown in FIG. 2), instead of the first paper layer 110.

Figure 8:
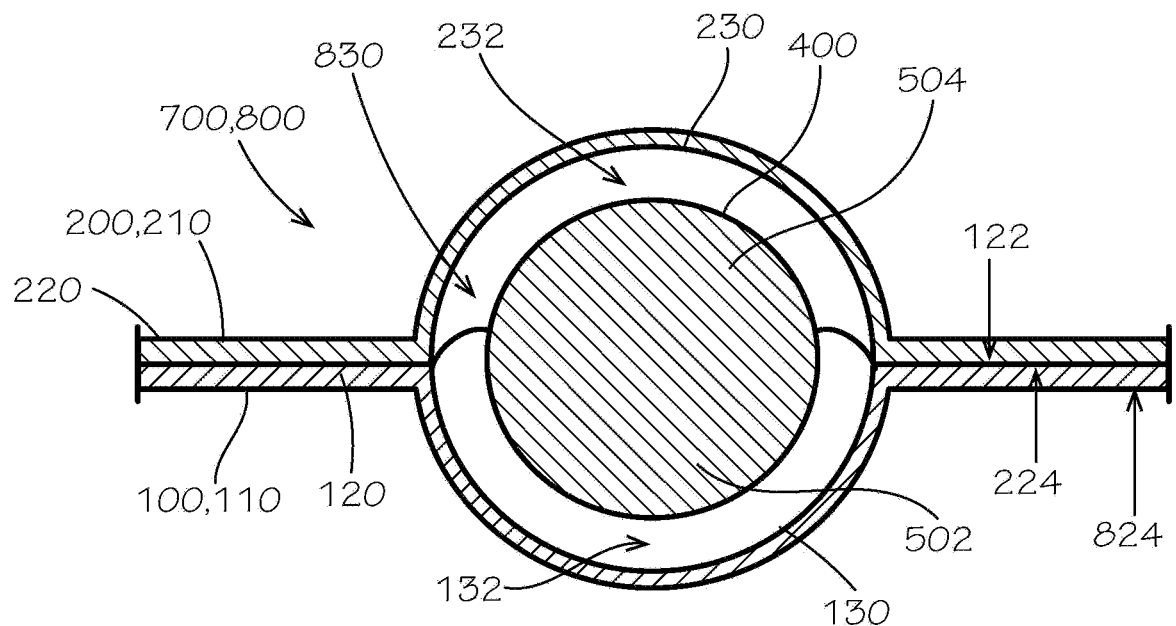
FIG. 8 is a detail cross-sectional view of the cushioning sheet of FIG. 7 taken along line 8-8 in FIG. 7.

FIGS. 7 and 8 illustrate a second step in forming the cushioning sheet 700, wherein the second layer 200 can be laid over the first layer 100 (shown in FIG. 8), or vice versa, with the spherical cushioning inserts 400 (shown in FIG. 8) received therebetween. As such, in the present aspect, the first layer 100 can be a lower layer and the second layer 200 can be an upper layer, relative to the orientations shown. Referring to FIG. 8, the first layer 100, second layer 200, and spherical cushioning inserts 400 can together define the cushioning sheet 700. In the present aspect, the first layer 100 can be the first paper layer 110, the second layer 200 can be the second paper layer 210, and the cushioning sheet 700 can be wrapping paper 800 within which an object can be wrapped for cushioned protection. As shown, the second paper layer 210 can be positioned over the first paper layer 110 such that each of the second sockets 230 of the second paper layer 210 can be aligned with a corresponding one of the first sockets 130 of the first paper layer 110. Each corresponding pair of first and second sockets 130,230 can together define a hollow, substantially spherical void 830 or bubble.

The spherical void 830 can comprise the corresponding semi-spherical first recess 132 and semi-spherical second recess 232, and each of the cushioning inserts 400 can reside between a corresponding pair of first and second sockets 130,230 within the spherical void 830. As shown, the lower portion 502 of the cushioning insert 400 can generally reside within the corresponding first recess 132 and the upper portion 504 of the cushioning insert 400 can generally reside within the corresponding second recess 232. In the present aspect, a diameter of each void 830 can be larger than the diameter $D_1$ (shown in FIG. 4) of the corresponding cushioning insert 400 and each of the cushioning inserts 400 can be received loosely within the void 830, allowing the cushioning insert 400 to move around within the void 830. In other aspects, the size of the voids 830 may be about equal to the size of the cushioning inserts 400 and/or the cushioning inserts 400 may be secured within the void 830 to limit or prohibit movement therein. Other aspects of the cushioning sheet 700 may not comprise the cushioning inserts 400, and the voids 830 can be filled with any other suitable cushioning material. In other aspects, the voids 830 can be filled with air (or any other suitable gas), such that a plurality of cushioning air pockets can be formed between the first and second layers 100,200. In such aspects, the first and second layers 100,200 may comprise a specific paper material that can be configured to limit or prevent the air from leaking out of the voids 830. In some aspects, the first and second layers 100,200 can comprise a stretchy paper material. In some aspects, the first and second layers 100, 200 can be coated in a material configured to limit or prevent the passage of air therethrough. Other aspects of the first and second layers 100 can comprise any suitable material, including paper and non-paper materials, configured to limit or prevent the passage of air therethrough.

As described above, example aspects of the second paper layer 210 can comprise an adhesive 240 (shown in FIG. 2) applied to the second lower surface 224 thereof. The second lower surface 224 of the second paper layer 210 can engage the first upper surface 122 of the first paper layer 110, and the adhesive 240 can join the second lower surface 224 to the first upper surface 122, thereby securing the first and second paper layers 110,210 together. In some aspects, the second step of applying the second paper layer 210 over the first paper layer 110 can be the final step in forming the cushioning sheet 700. However, in other aspects, a third step can comprise passing the cushioning sheet 700 through a sheet rolling device 900 (shown in FIG. 9). As described above, the adhesive 240 can be repulpable in some aspects. In some example aspects, additional components of the cushioning sheet 700, or the entire cushioning sheet 700, can comprise repulpable materials.

Figure 9:
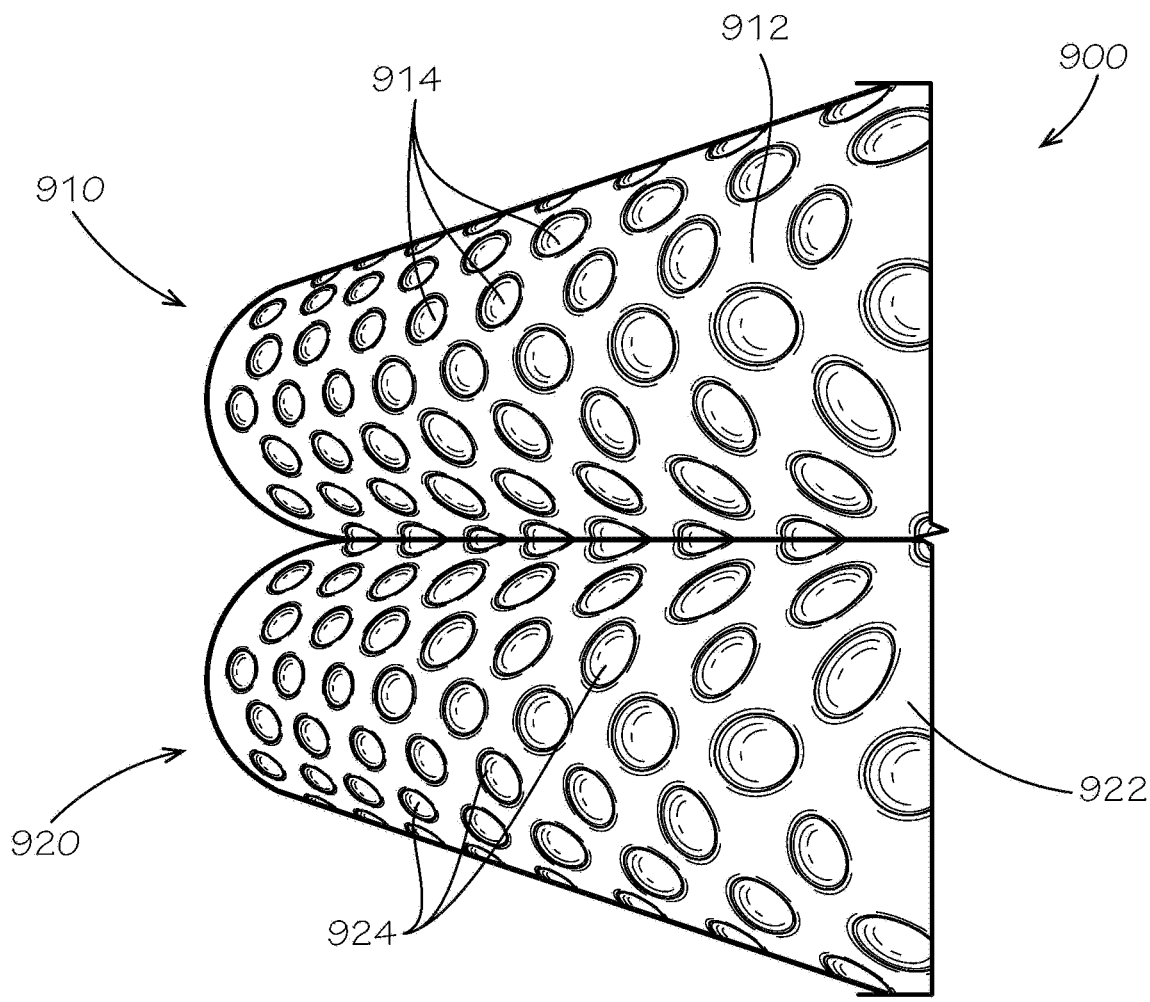
FIG. 9 is a perspective view of sheet rolling device configured to assist in adhering the first paper layer of FIG. 1 to the second paper layer of FIG. 2, in accordance with another aspect of the present disclosure.

FIG. 9 illustrates the sheet rolling device 900, which can be provided for pressing the planar first base 120 of the first paper layer 110 (both 110 and 120 shown in FIG. 1) against the planar second base 220 of the second paper layer 210 (both 210 and 220 shown in FIG. 2) to ensure that the adhesive 240 (e.g., the starch paste 242, both 240 and 242 shown in FIG. 2) secures the first and second paper layers 110,210 to one another. As shown, the sheet rolling device 900 can define a first sheet roller 910 and a second sheet roller 920. Each of the first and second sheet rollers 910,920 can define a cylindrical outer surface 912,922, respectively and a plurality of semi-spherical indentations 914,924, respectively, which can be sized about equal to or greater than each of the first and second sockets 130,230. The first and second sheet rollers 910,920 can be configured to rotate in unison, as the cushioning sheet 700 (e.g., the wrapping paper 800), both shown in FIG. 8, is fed through the sheet rolling device 900 between the first and second sheet rollers 910,920. According to example aspects, each of the indentations 914 of the first sheet roller 910 can be configured to align with a corresponding one of the indentations 924 of the second sheet roller 920 as the first and second sheet rollers 910,920 confront one another during rolling. As the cushioning sheet 700 is fed through the sheet rolling device 900, each of the first sockets 130 (shown in FIG. 1) of the first paper layer 110 can align with and extend into a corresponding one of the indentations 914 of the first sheet roller 910, and similarly, each of the second sockets 230 (shown in FIG. 2) of the second paper layer 210 can align with and extend into a corresponding one of the indentations 924 of the second sheet roller 920. In this way, each of the semi-spherical first and second sockets 130,230, as well as the spherical voids 830 (shown in FIG. 8) formed by the first and second sockets 130,230, can maintain their shapes as the cushioning sheet 700 is passed through the sheet rolling device 900.

Figure 10:
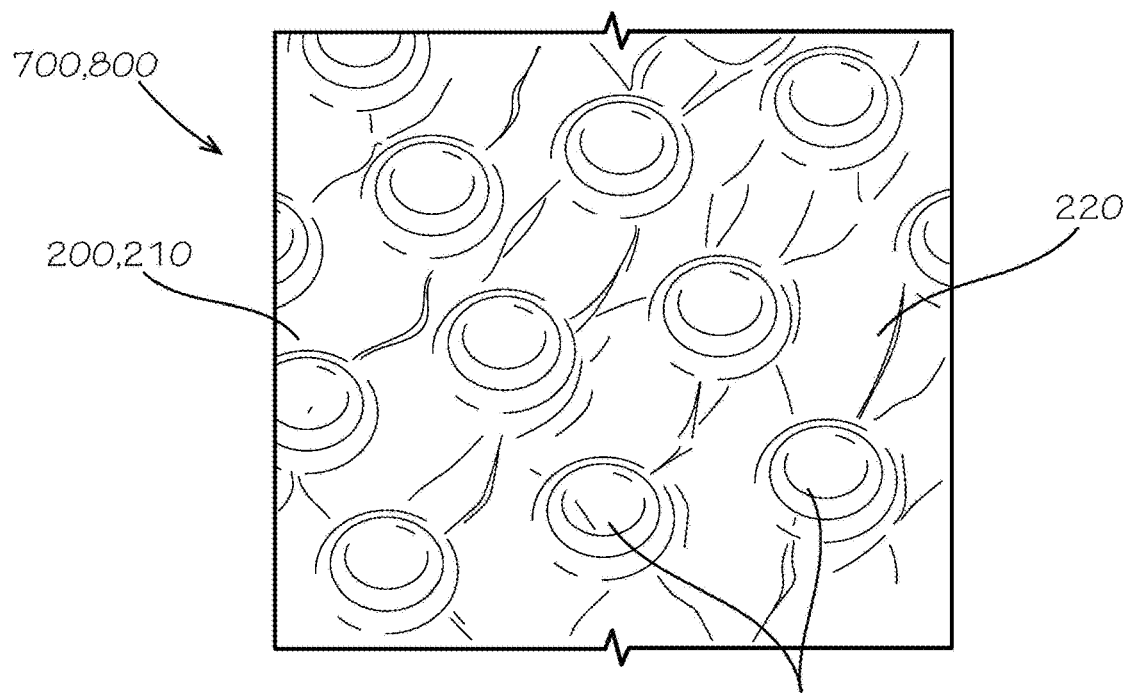
FIG. 10 is a top view of the cushioning sheet of FIG. 7 after going through the sheet rolling device of FIG. 9.
Figure 11:
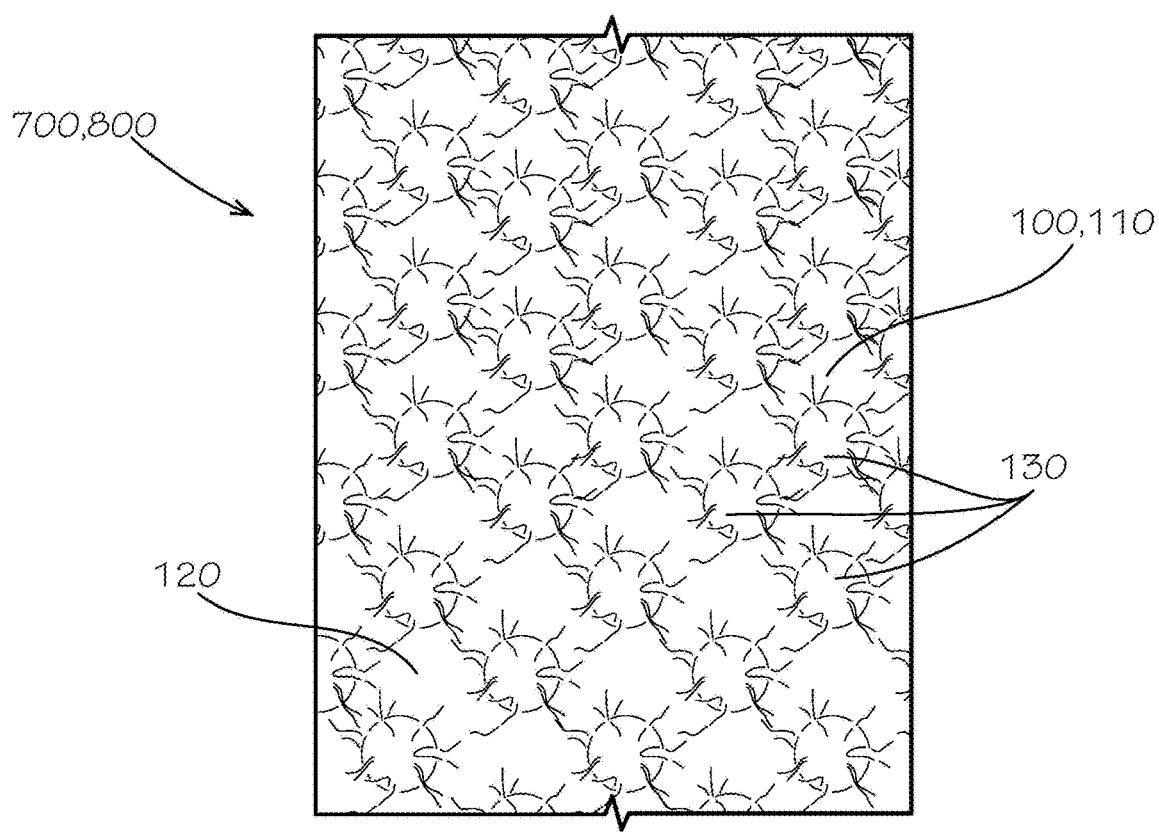
FIG. 11 is a bottom view of the cushioning sheet of FIG. 7 after going through the sheet rolling device of FIG. 9.

Furthermore, as the cushioning sheet 700 is fed through the sheet rolling device 900, the portions of cylindrical outer surfaces 912,922 of the first and second sheet rollers 910, 920 extending between the indentations 914,924 can be configured to contact the planar first and second bases 120,220 of the first and second paper layers 110,210, respectively. The first and second sheet rollers 910,920 can press the first upper surface 122 (shown in FIG. 1) of the first paper layer 110 against the second lower surface 224 (shown in FIG. 2) of the second paper layer 210, such that the adhesive 240 applied to the second lower surface 224 firmly engages the first upper surface 122, thereby further securing the first and second paper layers 110,210 together. As described above, in some aspects, a substantially thin film or layer of the adhesive 240 can be applied to the second lower surface 224. However, in some aspects, the film or layer of adhesive 240 can be thick enough such that some of the adhesive 240 may be pressed into some or all of the voids 830, forming an adhesive ring around the corresponding cushioning insert 400 (shown in FIG. 4) therein, which can aid in holding the cushioning insert 400 in place within the void 830 and/or which may increase the strength and/or cushioning ability of the cushioning sheet 700 in some aspects. FIG. 10 illustrates a top view of the cushioning sheet 700 after being passed through the sheet rolling device 900 (shown in FIG. 9) to ensure the first base 120 (shown in FIG. 1) of the first paper layer 110 (shown in FIG. 1) is adequately secured to the second base 120 of the second paper layer 210, and FIG. 11 illustrates a bottom view of the cushioning sheet 700 after passing through the sheet rolling device 900.

Figure 12:
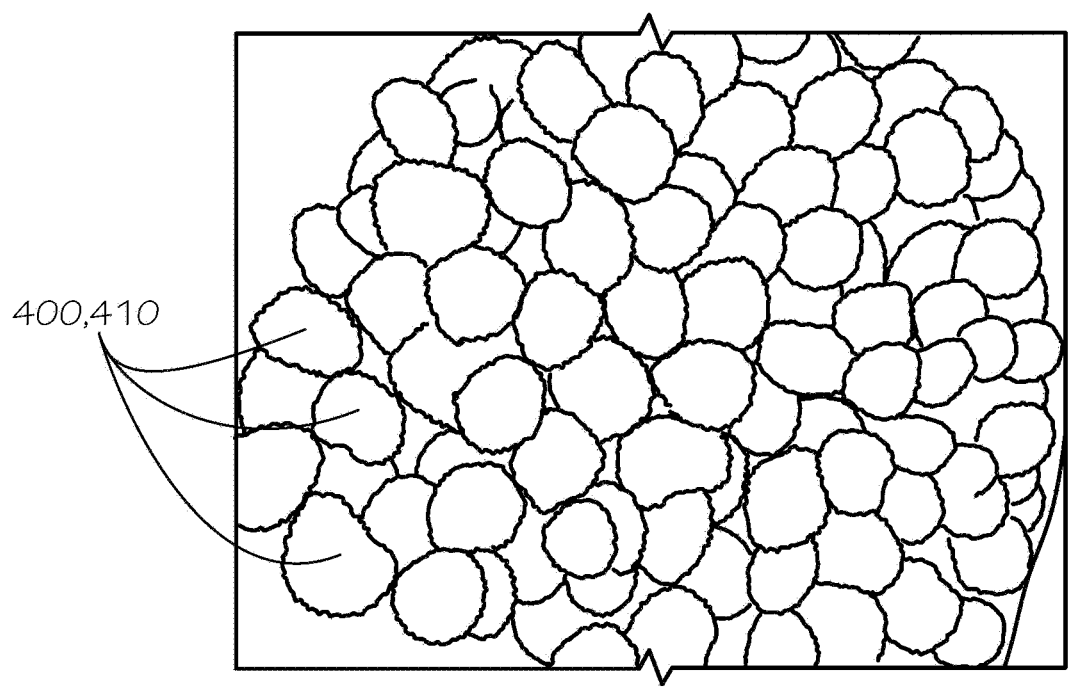
FIG. 12 is a top view of the spherical cushioning inserts, in accordance with another example aspect of the present disclosure.
Figure 13:
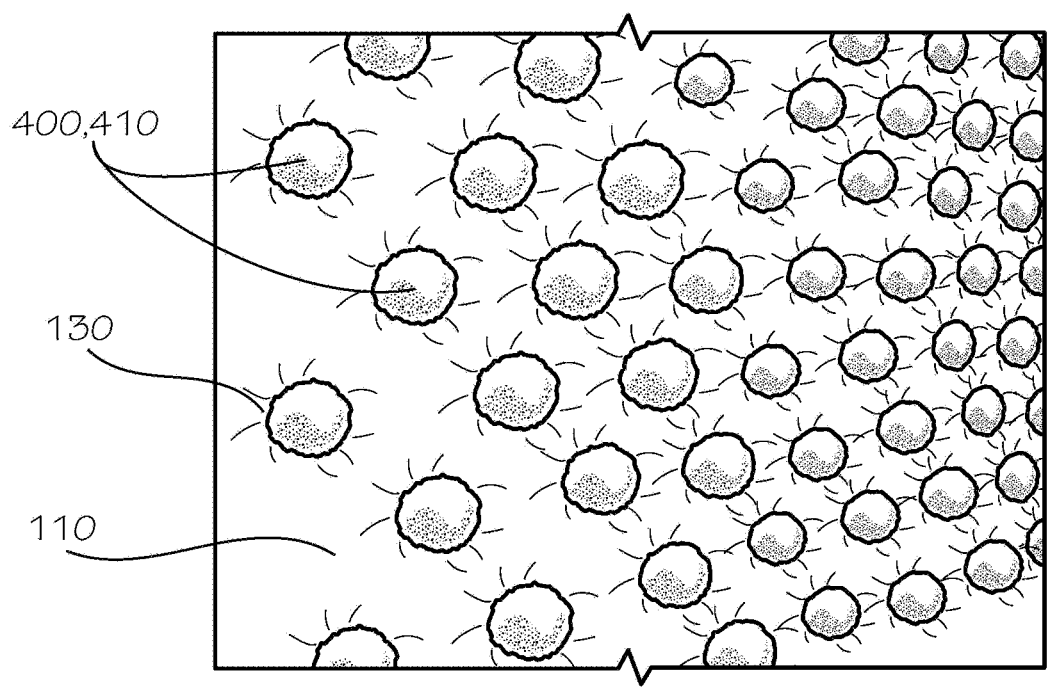
FIG. 13 is a top perspective view of the spherical cushioning inserts of FIG. 12 applied to the first paper layer, in accordance with another example aspect of the present disclosure.

FIG. 12 illustrates the cushioning inserts 400 according to another example aspect of the present disclosure, wherein the cushioning inserts 400 again define a substantially spherical shape. In the present aspect, the spherical shape of the cushioning inserts 400 is even more defined that the substantially spherical cushioning inserts shown in FIG. 4. Furthermore, in the present aspect, the cushioning inserts 400 can be the starch cushioning inserts 410. FIG. 13 illustrates each of the cushioning inserts 400 of FIG. 12 placed into a corresponding one of the semi-spherical first sockets 130 of the first paper layer 110.

Figure 14:
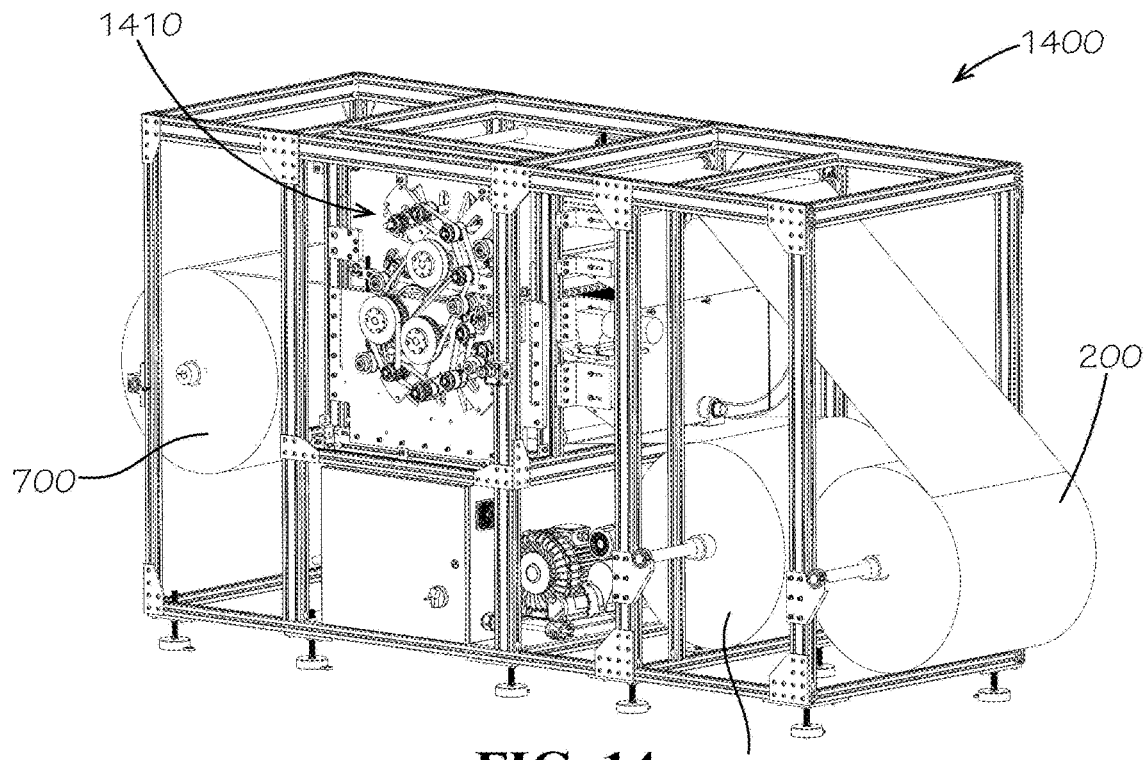
FIG. 14 is rear perspective view of a rolling machine for forming the cushioning sheet of FIG. 7, in accordance with another example aspect of the present disclosure.
Figure 15A:
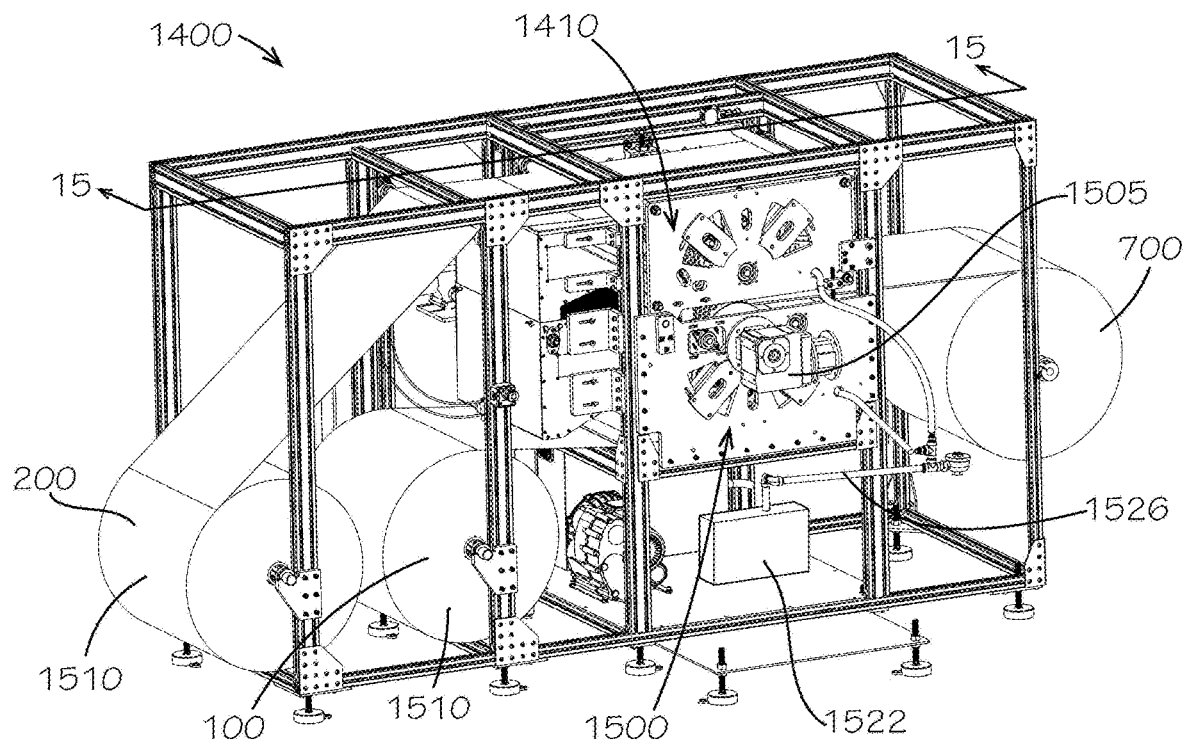
FIG. 15A is a front perspective view of the rolling machine of FIG. 14.
Figure 15B:
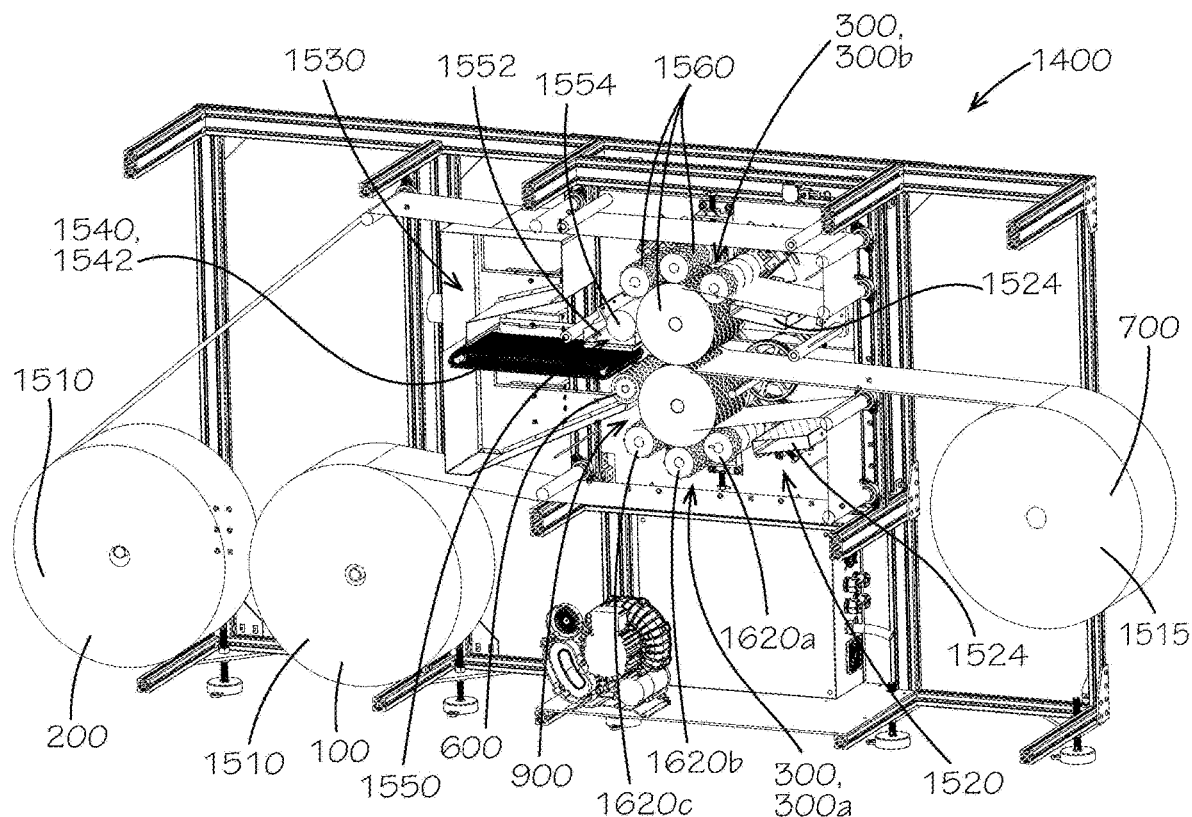
FIG. 15B is a cross-sectional view of the rolling machine of FIG. 14 taken along line 15-15 in FIG. 15A.

FIGS. 14 and 15A-B illustrate the rolling machine 1400, according to an example aspect of the present disclosure, for forming the cushioning sheet 700. FIG. 14 illustrates a rear perspective view of the rolling machine 1400, FIG. 15A illustrates a front perspective view of the rolling machine 1400, and FIG. 15B illustrates a cross-sectional view of the rolling machine 1400 taken along line 15-15 in FIG. 15A. Example aspects of the rolling machine 1400 can comprise a roller assembly 1410, which can comprise a plurality of rollers 1560 (shown in FIG. 15B). In the present aspect, the roller assembly 1410 can comprise two of the layer rolling devices 300 (shown in FIG. 15B) for simultaneously forming the first and second sockets 130,230 (shown in FIGS. 1 and 2, respectively) in the first and second layers 100,200, respectively. Other aspects of the rolling machine 1400 can comprise only one of the layer rolling devices 300, which can form the first and second sockets 130,230 in the first and second layers 100,200 either simultaneously or consecutively. The roller assembly 1410 of the rolling machine 1400 can further comprise the sheet rolling device 900 (shown in FIG. 15B) for sealing the first layer 100 to the second layer 200 with the cushioning inserts 400 (shown in FIG. 4) received therebetween. Referring to FIG. 15A, a drive system 1500 can be provided for driving the movement of the roller assembly 1410 during production of the cushioning sheet 700. As shown, example aspects of the drive system 1500 can comprise one or more motors 1505 configured to impart rotational movement to the various rollers 1560 (shown in FIG. 15B) of the roller assembly 1410, as described in further detail below.

According to example aspects, each of the first and second layers 100,200 can be formed as a roll of raw material 1510 (e.g., a roll of paper, as shown) prior to being passed through the rolling machine 1400. Referring to FIG. 15B, the rolling machine 1400 can comprise the two layer rolling devices 300—for example, a first layer rolling device 300a and a second layer rolling device 300b. In some aspects, the rolling machine 1400 can comprise one or more steam units 1520 configured to steam the first and second layers 100,200 prior to passage through the corresponding layer rolling devices 300. Steaming the first and second layers 100,200 can soften the paper material, which can allow the paper material to stretch without tearing during formation of the first and second sockets 130,230 (shown in FIGS. 1 and 2, respectively). Example aspects of the steam unit 1520 can comprise a water tank 1522 (shown in FIG. 15A), one or more steam pans 1524, and one or more conduits 1526 (shown in FIG. 15A) for transferring water from the water tank 1522 to the steam pans 1524. The steam pans 1524 can be configured to heat the water received from the water tank 1522 to produce steam. In example aspects, as shown, each of the first and second layers 100,200 can pass over a corresponding one of the steam pans 1524 before being fed into the corresponding layer rolling device 300. The layer rolling devices 300 can then form the first and second sockets 130,230 in the first and second layers 100,200, as described above. In some aspects, one or both of the steam units 1520 can be turned off or left unused when it is desired to cold set the first and/or second layers 100,200. Other aspects of the rolling machine 1400 may not comprise the steam units 1520 or the steam units 1520 can be removed as desired. Furthermore, in example aspects, the layer rolling devices 300 can be used to form the first and second sockets 130,230 in the corresponding first and second layers 100, 200, and the first and second layers 100,200 can then be removed from the rolling machine 1400 and used as textured sheets of material (e.g., a textured paper sheets). In some aspects, only one of the layer rolling devices 300 may be used or provided for forming a textured sheet from the first layer 100 and/or second layer 200.

Once the first sockets 130 have been formed in the first layer 100 by the corresponding first layer rolling device 300*a*, the cushioning inserts 400 (shown in FIG. 4) can be positioned within the first sockets 130. Example aspects of the rolling machine 1400 can comprise the vacuum roller 600 for picking up the cushioning inserts 400 from a hopper 1530 or other repository and depositing them onto the first upper surface 122 (shown in FIG. 1) of the first layer 100. Some aspects of the rolling machine 1400 can also comprise a vibration mechanism 1540 configured to vibrate each of cushioning inserts 400 into a corresponding one of the insert indentations 604 (shown in FIG. 6) of the vacuum roller 600. For example, in the present aspect, the vibration mechanism 1540 can comprise a vibrating conveyor belt 1542. The cushioning inserts 400 can be fed from the hopper 1530 onto the vibrating conveyor belt 1542, which can agitate the cushioning inserts 400 thereon. The agitated cushioning inserts 400 can be transported along the conveyor belt 1542 and can be deposited onto the vacuum roller 600. The movement of the cushioning inserts 400 caused by the vibrating conveyor belt 1542 can aid in locating the cushioning inserts 400 within the insert indentations 604. For example, the agitated cushioning inserts 400 can slide, roll, or otherwise move across the cylindrical outer surface 602 (shown in FIG. 6) of the vacuum roller 600 until dropping into a corresponding one of the insert indentations 604. The cushioning inserts 400 can be retained within the corresponding insert indentations 604 of the vacuum roller 600 by suction provided through the corresponding vacuum port 606 (shown in FIG. 6).

Additionally, once the second sockets 230 have been formed in the second layer 200 by the corresponding second layer rolling device 300*b*, the adhesive 240 (shown in FIG. 2) can be applied to the second lower surface 224 (shown in FIG. 2) of the second layer 200. According to example aspects, the rolling machine 1400 can comprise an adhesive applicator 1550 configured to apply the adhesive 240 to the second lower surface 224. In the present aspect, the adhesive applicator 1550 can comprise an adhesive pan 1552 and an adhesive roller 1554. A pool of the adhesive 240 can be received in the adhesive pan 1552, and the adhesive roller 1554 can be continuously dipped into the pool of the adhesive 240 as the adhesive roller 1554 rotates, thereby continuously applying the adhesive 240 to the adhesive roller 1554. After dipping into the pool of the adhesive 240, the adhesive roller 1554 can rotate into contact with the second layer 200 to continuously apply the adhesive 240 to the second lower surface 224 thereof. An example aspect of the adhesive applicator 1550 is shown and described in further detail below with respect to FIG. 15C.

Once the cushioning inserts 400 have been deposited on the first layer 100 and the adhesive 240 has been applied to the second layer 200, each of the first and second layers 100,200 can be simultaneously passed through the sheet rolling device 900 in facing contact with one another. As described above, when passing the first and second layers 100,200 through the sheet rolling device 900, each of the first sockets 130 of the first layer 100 can be aligned with a corresponding one of the second sockets 230 of the second layer 200 to define the substantially spherical void 830 (shown in FIG. 8) therebetween. Each of the cushioning inserts 400 can be positioned within a corresponding one of the voids 830, and the sheet rolling device 900 can adhere the first layer 100 to the second layer 200 to retain the cushioning inserts 400 within the corresponding voids 830. The cushioning sheet 700 can then exit the sheet rolling device 900, and in the present aspect, the cushioning sheet 700 can be wrapped around itself to define a finished roll 1515 of the cushioning sheet 700.

Figure 15C:
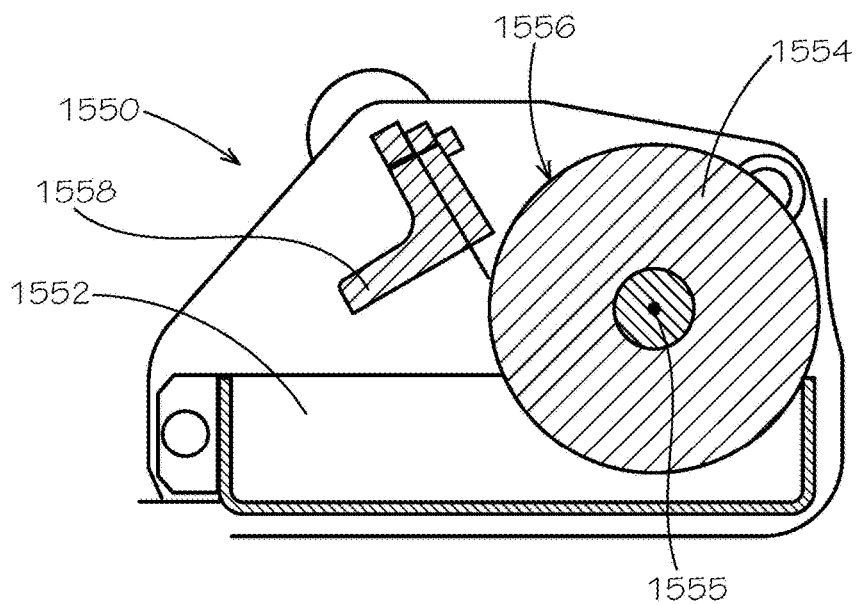
FIG. 15C is a front view of an adhesive applicator of the rolling machine of FIG. 14.

FIG. 15C illustrates a front view of the adhesive applicator 1550. As shown, the adhesive applicator 1550 can comprise the adhesive pan 1552 within which a pool of the adhesive 240 (shown in FIG. 2) can be received. The adhesive roller 1554 can be configured to rotate about a roller axis 1555 (going into the page) proximate to the adhesive pan 1552, such that an outer roller surface 1556 of the adhesive roller 1554 can be continuously rotated into the pool of glue. The adhesive roller 1554 can further be continuously rotated into contact with the second layer 200 (shown in FIG. 14) to apply the adhesive 240 thereto. For example, as a first portion of the outer roller surface 1556 rotates out of the pool of the adhesive 240 with the adhesive 240 applied thereto, the first portion can rotate into contact with the second layer 200. Specifically, the first portion of the adhesive roller 1554 can rotate into contact with the second lower surface 224 (shown in FIG. 2) of the second layer 200 as the second layer 200 moves through the roller assembly 1410 (shown in FIG. 14) towards the sheet rolling device 900 (shown in FIG. 15B), depositing the adhesive 240 on the second lower surface 224. Furthermore, in some aspects, the adhesive applicator 1550 can further comprise a doctor blade 1558 configured to remove any excess adhesive 240 from the adhesive roller 1554 after application of the adhesive 240 to the second layer 200. For example, after the first portion of the adhesive roller 1554 has applied the adhesive to the second layer 200, the first portion can be rotated into contact with the doctor blade 1558, which can scrape the outer roller surface 1556 to remove any excess adhesive 240 thereon prior to re-dipping the first portion into the pool of adhesive 240.

Figure 16:
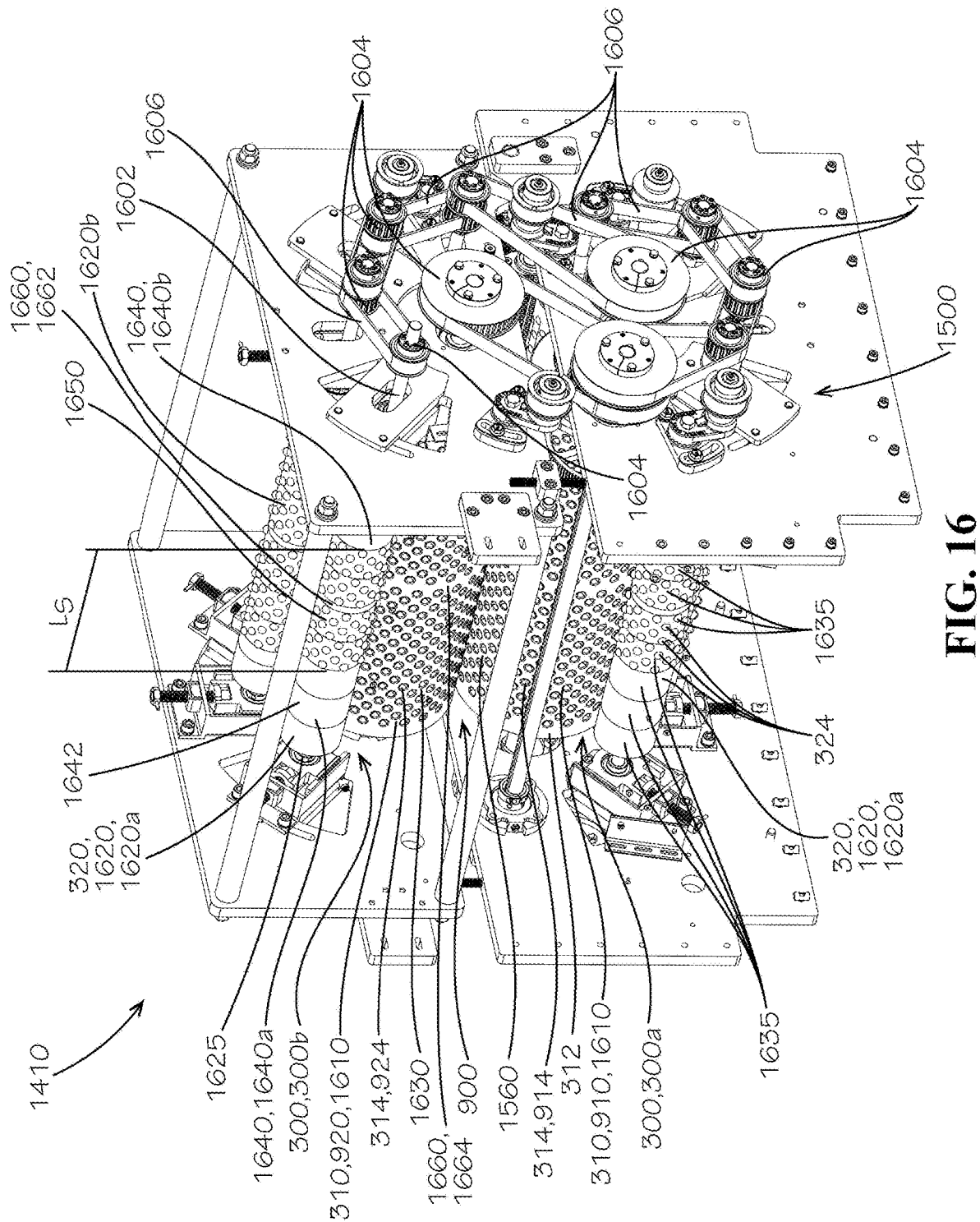
FIG. 16 is a detail perspective view of a roller assembly of the rolling machine of FIG. 14.

FIG. 16 illustrates a detail view of a roller assembly 1410 of the rolling machine 1400 (shown in FIG. 14), in accordance with an example aspect of the present disclosure. The roller assembly 1410 can comprise the pair of the layer rolling devices 300 and the sheet rolling device 900. The layer rolling devices 300 and the sheet rolling device 900 can be operably connected to one another by the drive system 1500, such that the various rollers 1560 thereof can rotate in unison. As described above, the drive system 1500 can comprise the motor 1505 (shown in FIG. 15A). Furthermore, in the present aspect, each of the rollers 1560 can comprise a rotating axle 1602, and the motor 1505 can be configured to directly drive one of the rotating axles 1602. For example, in the present aspect, the motor 1505 can directly drive the rotating axle 1602 of the first layer roller 310 of the first layer rolling device 300*a*. Example aspects of the drive system 1500 can further comprise a wheel 1604 or sprocket mounted on each of the rotating axles 1602, and the wheels 1604 or sprockets can be interconnected by one or more straps 1606 or chains to transmit rotational motion between the rollers 1560.

According to example aspects, each of the layer rolling devices 300 can comprise one or more of the first layer rollers 310 defining the socket indentations 314, which can be considered female rollers 1610. Each of the layer rolling devices 300 can further comprise one or more of the second layer rollers 320 defining the socket projections 324, which can be considered male rollers 1620. For example, in the present aspect, each layer rolling device 300 can comprise three small male rollers 1620*a,b,c* (1620*c* shown in FIG. 15B) oriented in series and configured to engage one large female roller 1610. Other aspects of the layer rolling devices 300 can comprise more female rollers 1610 and/or more or fewer male rollers 1620. The male rollers 1620 and female roller 1610 of each layer rolling device 300 can be interconnected by the drive system 1500 as described above and can rotate concurrently as the corresponding first and second layers 100,200 (shown in FIG. 14) are fed therethrough. As described above, each of the socket projections 324 of the male rollers 1620 can be configured to align with a corresponding one of the socket indentations 314 of the corresponding female roller 1610 as the female and male rollers 1610,1620 confront one another during rotation. Each of the socket projections 324 can be configured to push a portion of the corresponding first layer 100 or second layer 200 into the corresponding socket indentation 314 to form the first and second sockets 130,230 (shown in FIGS. 1 and 2), respectively.

In some aspects, some or all of the female and male rollers 1610, 1620 can be formed from a singular cylindrical structure 1630 extending from a first end 1625 of the corresponding roller 1560 to an opposite second end (not shown) of the corresponding roller 1560. A length of the roller can be defined between the first end 1625 and the opposite second end. In some aspects, some or all of the female and male rollers 1610,1620 can be formed from a plurality of cylindrical collars 1635 stacked laterally between the corresponding first end 1625 and the second end. Rollers 1560 comprising the collars 1635 can allow for selective adjustment of the length of the roller 1560 by adding or removing collars 1635. Furthermore, according to example aspects, each of the collars 1635 can be either a smooth collar 1640 defining a substantially smooth outer collar surface 1642 or a socket collar 1650 defining a plurality of the socket projections 324 or the socket indentations 314. For example, in the present aspect, each of the female rollers 1610 can define the singular cylindrical structure 1630, while each of the male rollers 1620 can define a plurality of the collars 1635. As shown, each of the male rollers 1620*a,b* can comprise one or more first smooth collars 1640*a* proximate to the corresponding first end 1625 and one or more second smooth collars 1640*b* proximate to the corresponding second end. Each of the male rollers 1620*a,b* can further comprise one or more of the socket collars 1650 defining the socket projections 324 oriented centrally between the first and second smooth collars 1640*a,b*. The male roller 1620*c* (shown in FIG. 15B) can comprise the socket collars 1650 extending from the first end 1625 to the second end, and does not comprise any of the smooth collars 1640 in the present aspect. In other aspects, however, the male roller 1620*c* may comprise the smooth collars 1640.

According to example aspects, any of the rollers 1560 and/or collars 1635 can be selectively removed and replaced with rollers 1560 and/or collars 1635 having varying patterns, varying sizes, and/or other varying features. In one example, the rollers 1560 and/or collars 1635 can be replaced with rollers 1560 and/or collars 1635 defining larger or smaller socket indentations 314 and/or socket projections 324. In another example, the rollers 1560 and/or collars 1635 can be replaced with rollers 1560 and/or collars 1635 defining socket indentations 314 and/or socket projections 324 defining an alternative shape (e.g., cuboidal instead of semi-spherical). In another example, some or all of the smooth collars 1640 can be replaced with socket collars 1650 as desired, or vice versa.

According to example aspects, each of the female and male rollers 1610, 1620 can be about equal in length. In other aspects, some or all of the female and male rollers 1610, 1620 can define varying lengths. Additionally, as shown, each of the smooth collars 1640 can be about equal in size, and each of the socket collars 1650 can be about equal in size. In other aspects, the smooth collars 1640 and/or socket collars 1650 can define varying sizes. In the present aspect, the male rollers 1620*b* can define more of the socket collars 1650 and fewer of the smooth collars 1640 than the male rollers 1620*a*. Similarly, the male rollers 1620*c* (shown in FIG. 15B) can define more of the socket collars 1650 and fewer of the smooth collars 1640 than the male rollers 1620*b*. As such, a length $L_s$ of the stack of socket collars 1650 of the male rollers 1620*a* can be less than the length $L_s$ of the stack of socket collars 1650 of the male rollers 1620*b*, and the length $L_s$ of the stack of socket collars 1650 of the male rollers 1620*b* can be less than the length $L_s$ of the stack of socket collars 1650 of the male rollers 1620*c*. As described above, each of the collars 1635 can be selectively removed and replaced, and thus, the length $L_s$ can be selectively adjusted. Additionally, in some aspects, a height to which the socket projections 324 extend away from the corresponding socket collars 1650 can vary between some or all of the male rollers 1620*a,b,c*. For example, in some aspects, the socket projections 324 of the male roller 1620*a* can extend to a height that is less that a height of socket projections 324 of the male roller 1620*b*, and the socket projections 324 of the male roller 1620*b* can extend to a height that is less than a height of the socket projections 324 of the male roller 1620*c*. In other aspects, the socket projections 324 of each of the male rollers 1620*a,b,c* can be about equal in height.

According to example aspects, each of the first and second layers 100,200 (shown in FIG. 14) can be fed through the corresponding layer rolling devices 300 in the direction from the male roller 1620*a* to the male roller 1620*c*. The centrally-oriented socket collars 1650 of the male roller 1620*a* can form a center set 1912 (shown in FIG. 19) of the first and second sockets 130,230 at and around a center 1910 (shown in FIG. 19) of the first and second layers 100,200, respectively. The socket collars 1650 of the male roller 1620*b* can then form first and second intermediate sets 1914*a,b* (shown in FIG. 19) of the first and second sockets 130,230 on either side of the center set 1912. Finally, the socket collars 1650 of the male roller 1620*c* can form first and second outer sets 1916*a,b* (shown in FIG. 19) of the first and second sockets 130,230 adjacent to the first and second intermediate sets 1914*a,b* and distal to the center set 1912.

In some aspects, each of the male rollers 1620 can define one or more spacer areas 1660 extending about a circumference of the male roller 1620. For example, in the present aspect, each of the male rollers 1620 can define one of the spacer areas 1660 oriented about centrally along the length of the male roller 1620. In other aspects, each of the male rollers 1620 can define additional spacer areas 1660 and/or the spacer area(s) 1660 can be positioned anywhere along the length of the male roller 1620. As shown, each of the spacer areas 1660 can be substantially smooth and does not define the socket projections 324. In the present aspect, each of the spacer areas 1660 of the male rollers 1620 can be provided by a spacer collar 1662 positioned between adjacent socket collars 1650. In some aspects, the spacer collar 1662 can be similar to the smooth collars 1640. Furthermore, the spacer area 1660 of the male roller 1620*a* can be aligned with corresponding spacer areas 1660 of the male rollers 1620*b*, 1620*c*. According to example aspects, the spacer areas 1660 can define cutting portions extending lengthwise along the first and second layers 100,200, which can be substantially planar and which do not define the corresponding first and second sockets 130,230. The cutting portions of the first and second layers 100,200 can be aligned on the finished cushioning sheet 700, such that the cushioning sheet 700 can be cut lengthwise along the cutting portions without piercing any of the cushioning inserts 400 or voids 830. However, other aspects of the male rollers 1620 may not comprise the spacer areas 1660.

In some aspects, as shown, each of the female rollers 1610 can also define one or more of the spacer areas 1660. For example, in the present aspect, each of the female rollers 1610 can define one of the spacer areas 1660 oriented about centrally along a length of the female roller 1610. Each of the spacer areas 1660 of the female rollers 1610 can be formed as a smooth circumferential region 1664 of the cylindrical outer surface 312 of the female roller 1610. The smooth circumferential region 1664 of the female roller 1610 can be configured to align with the spacer collars 1662 of the male rollers 1620. In other aspects, however, the female rollers 1610 may not comprise the corresponding spacer areas 1660. The roller assembly 1410 can further comprise the sheet rolling device 900. According to example aspects, the sheet rolling device 900 can comprise each of the female rollers 1610 of the layer rolling devices 300. Thus, the female rollers 1610 of the layer rolling devices 300 can serve as the first and second sheet rollers 910,920, and the corresponding socket indentations 314 of the female rollers 1610 can serve as the indentations 914,924. The first and second sheet rollers 910,920 can confront another, and each of the first and second layers 100,200 can be simultaneously fed therebetween. As described above, each of the indentations 914 of the first sheet roller 910 can align with a corresponding one of the indentations 924 of the second sheet roller 920 as the first and second sheet rollers 910,920 are concurrently rotated. The first sockets 130 of the first layer 100 can extend into the indentations 914 of the first sheet roller 910, and the second sockets 230 of the second layer 200 can extend into the indentations 924 of the second sheet roller 920, allowing the voids 830 (shown in FIG. 8) therebetween to maintain their shape and preventing the cushioning inserts 400 (shown in FIG. 4) from being compressed or crushed therein. Additionally, as described above, the cylindrical outer surfaces 912,922 (shown in FIG. 9) of the first and second sheet rollers 910,920 surrounding the corresponding indentations 914,924 can press the second lower surface 224 (shown in FIG. 2) of the second layer 200 into contact with the first upper surface 122 (shown in FIG. 1) of the first layer 100. The adhesive 240 (shown in FIG. 2) applied to the second lower surface 224 of the second layer 200 can adhere to the first upper surface 122 of the first layer 100 to secure the first and second layers 100,200 together with the cushioning inserts 400 received in the voids 830, thereby defining the cushioning sheet 700 (shown in FIG. 7). The cushioning sheet 700 can then exit the roller assembly 1410 and can be wrapped around itself to define the finished roll 1515 (shown in FIG. 15B).

Thus, a method of forming the cushioning sheet 700 can comprise forming the plurality of first sockets 130 in the first layer 100, and forming the plurality of second sockets 230 in the second layer 200, wherein each of the second sockets 230 can correspond to a one of the first sockets 130. The method can further comprise positioning one of the cushioning inserts 400 within the void 830 defined between each corresponding pair of the first and second sockets 130,230, and coupling the first layer 100 to the second layer 200.

Figure 17:
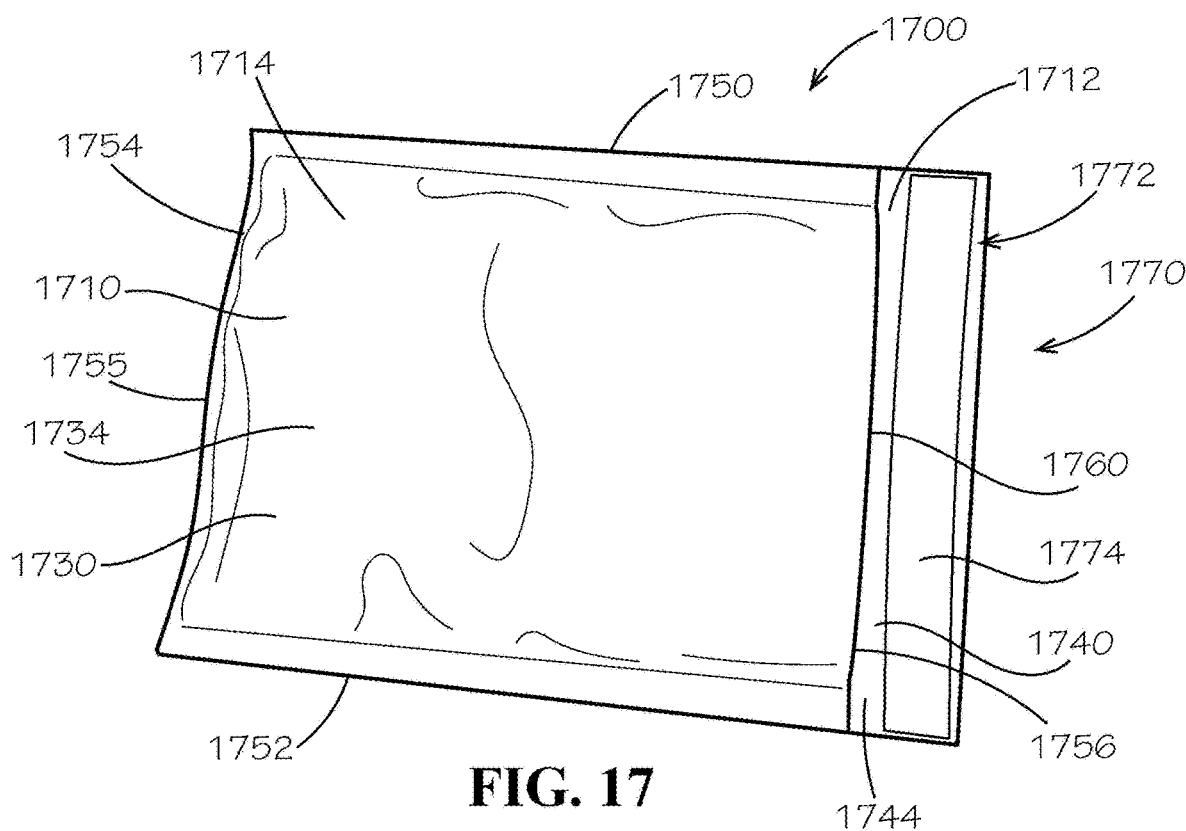
FIG. 17 is a front view of a cushioned mailer comprising the cushioning sheet of FIG. 7, in accordance with another example aspect of the present disclosure.
Figure 18:
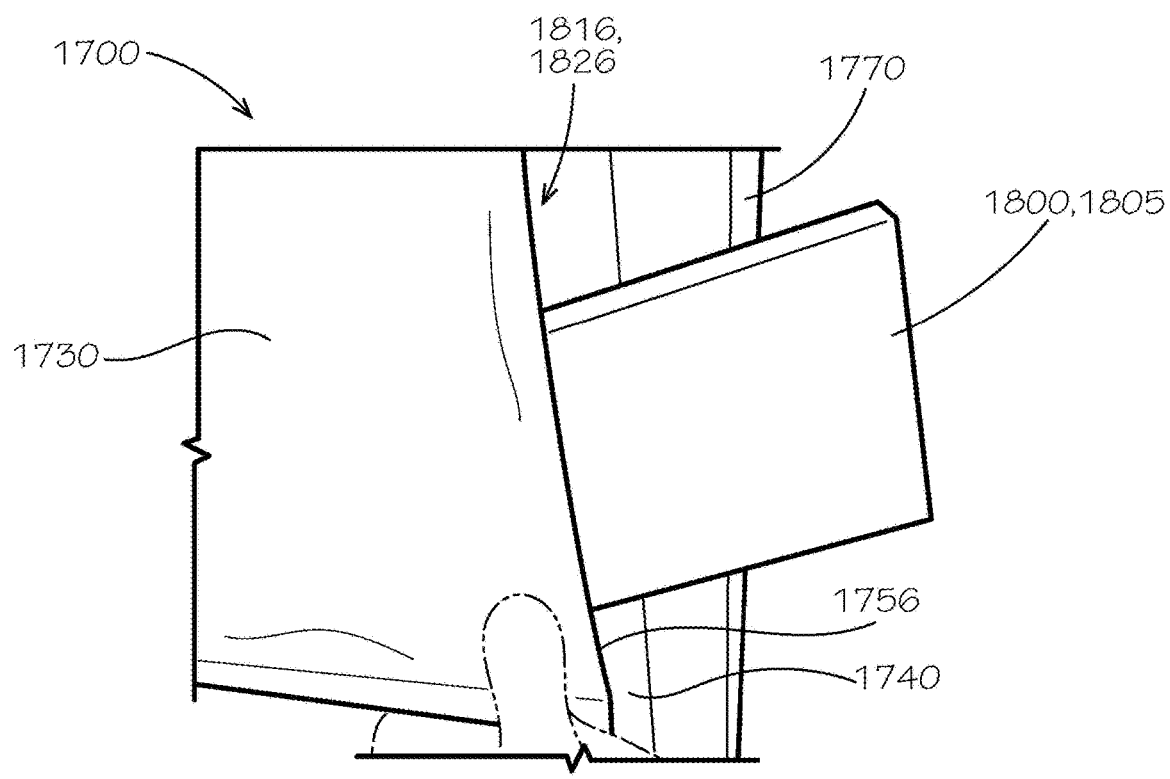
FIG. 18 is a front view of contents being inserted into an inner cavity of the cushioned mailer of FIG. 17.
Figure 19:
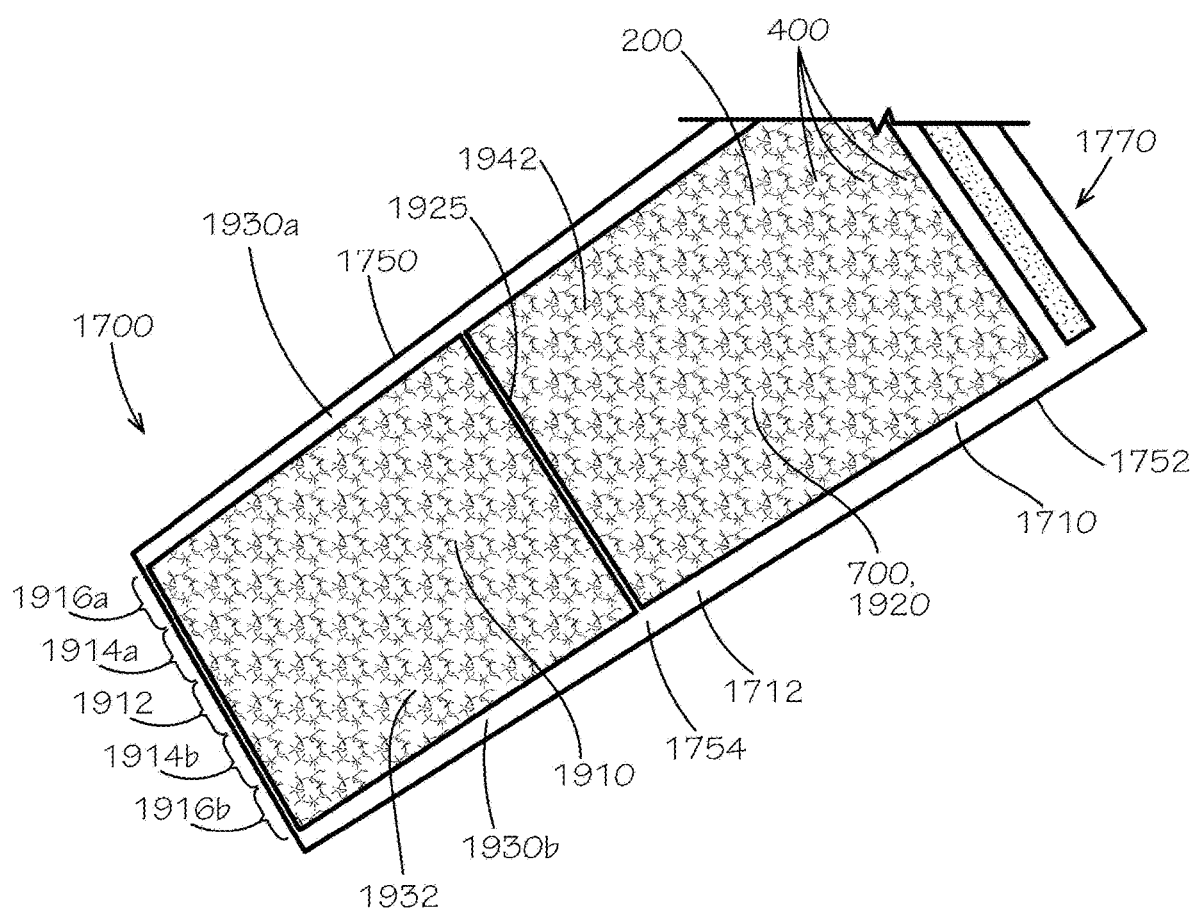
FIG. 19 is a front view of the cushioned mailer of FIG. 17 in an unfolded configuration.

FIGS. 17-19 illustrate a cushioned mailer 1700, in accordance with an example aspect of the present disclosure. Referring to FIG. 17, example aspects of the cushioned mailer 1700 can comprise an outer sheet 1710 defining an inner surface 1712 and an outer surface 1714. The outer sheet 1710 can be a substantially planar paper sheet in the present aspect, though in other aspects, the outer sheet 1710 can comprise any other suitable material and/or configuration. According to example aspect, the inner surface 1712 of the outer sheet 1710 can define an outer cavity 1816 (shown in FIG. 18). The cushioned mailer 1700 can further comprise the cushioning sheet 700 (shown in FIG. 19), which can be an inner sheet 1920 (shown in FIG. 19) in the present aspect, positioned within the outer cavity 1816 and coupled to the inner surface 1712 of the outer sheet 1710. For example, the cushioning sheet 700 can be coupled to the inner surface 1712 by an adhesive, such as, for example, glue, or any other suitable fastener known in the art. Other aspects of the cushioning sheet 700 may not be coupled to the outer sheet 1710 and can be loosely received within the outer cavity 1816. According to example aspects, the cushioning sheet 700 can define an inner cavity 1826, which can include portions of the outer cavity 1816. The cushioned mailer 1700 can be configurable in a folded configuration, as shown in FIGS. 17 and 18, and an unfolded configuration, as shown in FIG. 19. The cushioned mailer 1700 can further be configurable in an open orientation, as shown in FIGS. 17 and 18, and a closed orientation (not shown).

In the folded configuration, the cushioned mailer 1700 can define a front panel 1730 and a rear panel 1740 opposite the front panel 1730. The cushioning sheet 700 can define a front inner portion 1932 (shown in FIG. 19) of the front panel 1730, and the outer sheet 1710 can define front outer portion 1734 of the front panel 1730 opposite the front inner portion 1932. Similarly, the cushioning sheet 700 (i.e., the inner sheet 1920) can define a rear inner portion 1942 (shown in FIG. 19) of the rear panel 1740, and the outer sheet 1710 can define a rear outer portion 1744 of the rear panel 1740 opposite the rear inner portion 1942. The front inner portion 1932 of the cushioning sheet 700 can face the rear inner portion 1942 of the cushioning sheet 700, and the inner cavity 1826 can be substantially defined therebetween. The inner cavity 1826 can be configured to receive contents 1800 (shown in FIG. 18) therein, which can be substantially surrounded and cushioned by the cushioning sheet 700.

Example aspects of the cushioned mailer 1700 can further define a left side 1750, a right side 1752 opposite the left side 1750, a bottom end 1754, and a top end 1756 opposite the bottom end 1754. The front panel 1730 of the cushioned mailer 1700 can be hingedly coupled to the rear panel 1740 of the cushioned mailer 1700 at the bottom end 1754 at a fold line 1755, as shown. As such, both the outer cavity 1816 and the inner cavity 1826 can be closed at the bottom end 1754 of the cushioned mailer 1700. The fold line 1755 can be defined in at least the outer sheet 1710, and in some aspects, can further be defined in the cushioning sheet 700. In other aspects, the cushioning sheet 700 can define a cut 1925 (shown in FIG. 19) at the bottom end 1754 of the cushioned mailer 1700. Example aspects of the cushioned mailer 1700 can also be sealed at each of the left side 1750 and the right side 1752. For example, in some aspects, the inner surface 1712 of the outer sheet 1710 can be sealed to itself by an adhesive at the left and right sides 1750,1752, thereby closing the outer cavity 1816 and the inner cavity 1826 at the left and right sides 1750,1752. The adhesive can be, for example, glue or any other suitable adhesive known in the art. In other aspects, the left and right sides 1750,1752 can be sealed by any other suitable fastener. Furthermore, in other aspects, the cushioning sheet 700 can be sealed to itself or to the outer sheet 1710 to close the outer cavity 1816 and/or inner cavity 1826 at the left and right sides 1750, 1752.

Example aspects of the cushioned mailer 1700 can further be oriented in the open orientation, as shown, and the closed orientation. In the open orientation, an opening 1760 can be defined at the top end 1756 of the cushioned mailer 1700 to allow access to inner cavity 1826. In the closed orientation, the inner cavity 1826 can be selectively closed at the top end 1756. In some aspects, the cushioned mailer 1700 can define a closure flap 1770 for selectively covering the opening 1760 and sealing the top end 1756 of the cushioned mailer 1700 in the closed orientation, thereby securing the contents 1800 within the inner cavity 1826. In the present aspect, the rear outer portion 1744 of the rear panel 1740 of the cushioned mailer 1700 can define the closure flap 1770 extending from the top end 1756 thereof. Thus, the closure flap 1770 can be defined by the outer sheet 1710, as shown. The closure flap 1770 can define an adhesive strip 1772 extending substantially from the left side 1750 to the right side 1752 of the cushioned mailer 1700. The adhesive strip 1772 can be selectively covered by a peelable backing 1774 in some aspects, which can be peeled away from the cushioned mailer 1700 to reveal the adhesive strip 1772. With the peelable backing 1774 removed, the closure flap 1770 can be folded over the top end 1756 of the cushioned mailer 1700, and the adhesive strip 1772 can be adhered to the front outer portion 1734 of the front panel 1730 of the cushioned mailer 1700. FIG. 18 illustrates the contents 1800 (for example, a small box 1805, as shown) being inserted into the inner cavity 1826 of the cushioned mailer 1700 through the top end 1756 thereof in the open orientation.

FIG. 19 illustrates the cushioned mailer 1700 in the unfolded configuration. As shown, the cushioning sheet 700 can be adhered to the inner surface 1712 of the outer sheet 1710. In the present aspect, the first layer 100 (shown in FIG. 14) of the cushioning sheet 700 can be adhered to the outer sheet 1710, and the second layer 200 of the cushioning sheet 700 can face away from the outer sheet 1710. As such, the second layer 200 of the cushioning sheet 700 can at least partially surround and define the inner cavity 1826 (shown in FIG. 18) in the folded configuration. The cushioning sheet 700 can further comprise the cushioning inserts 400 received in the voids 830 (shown in FIG. 8) between the first layer 100 and the second layer 200, and the cushioning inserts 400 can provide cushioned protection to the contents 1800 (shown in FIG. 18) received in the inner cavity 1826. The cushioning sheet 700 can further define the cut 1925 at the bottom end 1754 of the cushioned mailer 1700 to separate the cushioning sheet 700 into the front inner portion 1932 and the rear inner portion 1942. In other aspects, the cushioning sheet 700 can define the fold line 1755 (shown in FIG. 17) between the front inner portion 1932 and the rear inner portion 1942. The cut 1925 can facilitate folding the cushioned mailer 1700 from the unfolded configuration to the folded configuration. As shown, in example aspects, the outer sheet 1710 can define left and right sealing flaps 1930a,b extending beyond the cushioning sheet 700 at the left and right sides 1750,1752 of the cushioned mailer 1700.

In the folded orientation, the portions of the left and right sealing flaps 1930a,b proximate to the front inner portion 1932 can be coupled to the portions of the left and right sealing flaps 1930a,b, respectively, proximate to the rear inner portion 1942 to seal the left and right sides 1750,1752 of the cushioned mailer 1700.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A cushioning sheet comprising:
a first layer defining a first inner surface;
a second layer coupled to the first layer, the second layer defining a second inner surface facing the first inner surface so that the first inner surface and the second inner surface define a plurality of voids therebetween; and
a plurality of cushioning inserts disposed between the first layer and the second layer, wherein each of the plurality of cushioning inserts is received in a corresponding one of the voids, and each void has a diameter that is larger than a diameter of the cushioning insert disposed therein so that each void is configured to loosely receive the cushioning insert disposed therein.

2. The cushioning sheet of claim 1, wherein the first layer is a first paper layer and the second layer is a second paper layer.

3. The cushioning sheet of claim 2, wherein each of the first paper layer and the second paper layer comprise a tissue-grade paper material.

4. The cushioning sheet of claim 2, wherein each of the first paper layer and the second paper layer are covered with a coating to increase strength and maintain flexibility of the first paper layer and the second paper layer.

5. The cushioning sheet of claim 2, wherein the first paper layer is substantially identical to the second paper layer.

6. The cushioning sheet of claim 2, wherein each of the plurality of cushioning inserts comprises a starch material, and wherein the starch material is repulpable.

7. The cushioning sheet of claim 6, wherein the starch material is a corn starch material.

8. The cushioning sheet of claim 6, wherein each of the plurality of cushioning inserts is substantially spherical in shape.

9. The cushioning sheet of claim 8, wherein a diameter of each of the plurality of cushioning inserts is about 0.375 inches.

10. The cushioning sheet of claim 1, wherein the second layer is coupled to the first layer by an adhesive.

11. The cushioning sheet of claim 10, wherein the adhesive is a starch paste, and wherein the starch paste is repulpable.

12. The cushioning sheet of claim 10, wherein:
the cushioning sheet defines a first side, a second side opposite the first side, a first end, and a second end opposite the first end; and
the first layer is adhered to the second layer by the adhesive at the first side, the second side, the first end, and the second end.

13. The cushioning sheet of claim 12, wherein the plurality of cushioning inserts are offset from the first side, the second side, the first end, and the second end towards a center of the cushioning sheet.

14. The cushioning sheet of claim 13, wherein:
each of the first layer and the second layer defines a first side sealing flap and a second side sealing flap opposite the first side sealing flap;
the first side sealing flap of the first layer is adhered to the first side sealing flap of the second layer at the first side of the cushioning sheet; and
the second side sealing flap of the first layer is adhered to the second side sealing flap of the second layer at the second side of the cushioning sheet.

15. The cushioning sheet of claim 10, wherein at least some of the plurality of cushioning inserts are adhered to at least one of the first layer or the second layer by the adhesive.

16. The cushioning sheet of claim 10, wherein:
the adhesive is a first adhesive; and
at least some of the plurality of cushioning inserts are adhered to at least one of the first layer or the second layer by a second adhesive that is different from the first adhesive.

17. The cushioning sheet of claim 16, wherein the second adhesive is a polyvinyl acetate glue.

18. The cushioning sheet of claim 1, wherein each void is defined by at least a first socket defined in the first layer.

19. The cushioning sheet of claim 18, wherein each void is further defined by at least a second socket defined in the second layer.

20. The cushioning sheet of claim 19, wherein each first and second socket is semi-spherical in shape.

* * * * *